US009207899B2

(12) United States Patent
Kaneko

(10) Patent No.: US 9,207,899 B2
(45) Date of Patent: Dec. 8, 2015

(54) MANAGEMENT APPARATUS, SYSTEM, AND METHOD OF CONTROLLING THE SAME

(71) Applicant: CANON KABUSHIKI KAISHA, Tokyo (JP)

(72) Inventor: Shuhei Kaneko, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 13/852,171

(22) Filed: Mar. 28, 2013

(65) Prior Publication Data

US 2013/0265601 A1  Oct. 10, 2013

(30) Foreign Application Priority Data

Apr. 6, 2012 (JP) ................................. 2012-086948

(51) Int. Cl.
*G06F 15/00* (2006.01)
*G06F 3/12* (2006.01)
*G06F 9/445* (2006.01)
*G06F 9/44* (2006.01)

(52) U.S. Cl.
CPC ............ *G06F 3/1297* (2013.01); *G06F 3/1204* (2013.01); *G06F 3/1225* (2013.01); *G06F 3/1285* (2013.01); *G06F 8/61* (2013.01); *G06F 9/4411* (2013.01)

(58) Field of Classification Search
None
See application file for complete search history.

(56) References Cited

U.S. PATENT DOCUMENTS

2007/0240156 A1*  10/2007  Nakata ........................... 717/178
2010/0085599 A1*   4/2010  Nomura ........................ 358/1.15
2012/0176641 A1*   7/2012  Ono .............................. 358/1.14

FOREIGN PATENT DOCUMENTS

JP  2007-086969 A  4/2007

* cited by examiner

*Primary Examiner* — Helen Q Zong
(74) *Attorney, Agent, or Firm* — Carter, DeLuca, Farrell & Schmidt, LLP

(57) ABSTRACT

A management apparatus designates a first installer program for installing a printer driver for a printer in an information processing apparatus, designates at least one second installer program for installing a program related to the printer driver in the information processing apparatus, designates an activation order of the first installer program and the second installer program, creates a setup program that includes the first installer program and the second installer program and is for activating the programs in the designated order, and registers the created setup program in a storage region in the printer.

12 Claims, 23 Drawing Sheets

FIG. 6

Main menu > Driver download

To remote UI    Login user:0000000    Logout

Driver download

List of downloadable printer drivers.

Updated date and time for displayed items XX/YY/2011 12:34  🔄

Driver list — 601

| No. | Display name | Driver type | Version | System type | Path | Comment | | |
|---|---|---|---|---|---|---|---|---|
| 1 | C_iR-ADV C5045 | Printer Driver A | 20.16 | 32bit | ¥¥share... | 602 | Download | Delete |
| 2 | C_iR-ADV C5045 | Printer Driver B | 20.20 | 64bit | ¥¥share... | | Download | Delete |
| 3 | C_iR-ADV C5045 (FAX) | FAX Driver A | 8.33 | 23bit | ¥¥share... | | Download | Delete — 603 |

◀

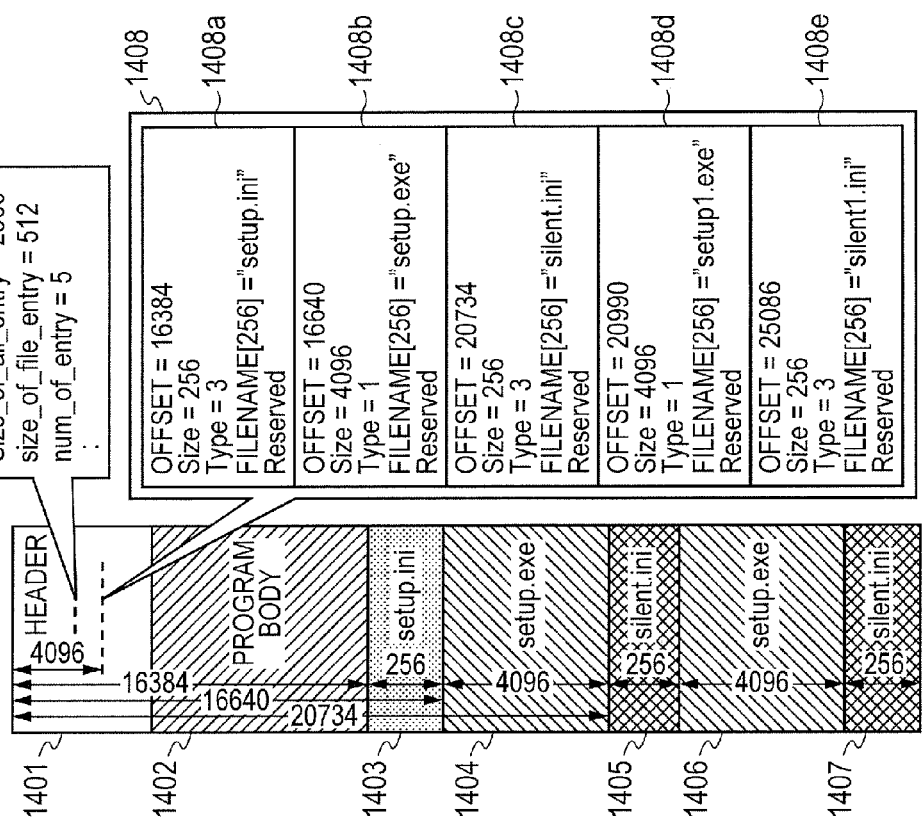
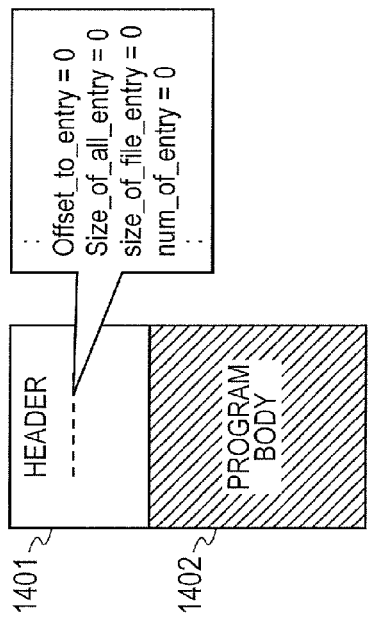
FIG. 14B
FIG. 14A

FIG. 15A

```
[DriverUploadInfo]
[C_iR-ADV C5051]
DriverModelName="C_iR-ADV C5045/5051"
PrinterName="C_iR-ADV C5051"
Comments="3F share printer"
PortType="1"
PortName=" "
DeviceModel=" "
```

FIG. 15B

```
[DriverUploadInfo]
[C_iR-ADV C5051]
DriverModelName="C_iR-ADV C5045/5051"
PrinterName="Color_Printer"
Comments="3F share printer"
PortType="1"
PortName="IP_172.10.10.10"
DeviceModel="C_iR-ADV C5051"
```

FIG. 16A

```
[InstallType]
Type=0
[InstallComplete]
Reboot=0
[SelectJob]
SelectJob=1
[PrinterInfo]
PRT1=
```

FIG. 16B

```
[InstallType]
Type=1
[InstallComplete]
Reboot=0
[SelectJob]
SelectJob=1
[SoftwareInfo]
SoftInfo=Software
[SoftwareOption]
SoftOption=Server/172.1.1.1
```

FIG. 16C

AFTER UPDATE (DEVICE NAME REFLECTED, IP REFLECTED)
    Color_Printer
    172.10.10.10

```
[InstallType]
Type=1
[InstallComplete]
Reboot=0
[SelectJob]
SelectJob=1
[PrinterInfo]
PRT1=Color_Printer, C_iR-ADV C5045/5051, IP_172.10.10.10
```

FIG. 25

| SOFTWARE | SOFTWARE VERSION | INSTALLED | SUPPORTED APPLICATION |
|---|---|---|---|
| Software1 | 1.0 | 1 | App1 |
| Software2 | 1.1 | 1 | App2 |
| Software3 | 3.4 | 1 | App3 |
| Software4 | 2.0 | 0 | App4 |
| Software5 | 1.0 | 0 | App5 |

2501, 2502, 2503, 2504

MANAGEMENT APPARATUS, SYSTEM, AND METHOD OF CONTROLLING THE SAME

BACKGROUND OF THE INVENTION

1. Field of the Invention

The present invention relates to installation of a device driver, such as a printer driver.

2. Description of the Related Art

In recent years, printers have been widespread in offices of companies, allowing anyone to easily perform printing. To allow a PC (personal computer) as an information processing apparatus to cause a printer to perform printing, a printer driver for generating a print data and controlling the printer is required to be installed in the PC.

In general, a printer driver is prepared for each of operating systems (OS) of the PCs and printers for printing, and provided via storing media, such as CD-ROM and FD, which are packed together with the printers.

An administrator typically acquires the latest printer driver through a public network from a website maintained by a printer manufacturer.

Furthermore, operations are performed where the administrator arranges the acquired printer driver and setting information used for installation in a storage device shared on a network, and announces the arranged location to general users to thereby allow the users to use the printer. Each general user installs the printer driver on a PC according to information acquired from the arranged location based on the announcement.

In the case of installing printers in an office, the printers to be used are typically different among users. It is difficult for the administrator and the general users to install the printer drivers and to set ports, which are destinations of print jobs, with no error.

A high-value-added printing system can be constructed by adding, to PCs, pieces of software related to the printing system (hereinafter, collectively called related software).

In some types of related software, a server setting is required to be reflected when a print environment of a client PC operated by a general user is constructed.

In the case of installing plural pieces of related software, the software should be installed in an appropriate order. Thus, setting is further complicated.

The environment of the client PC is typically constructed by a general user. It is difficult for the general user to install the printer driver and the related software and to perform setting with no error.

Conventionally, as a method of installing a printer driver, a technique has been proposed that acquires the printer driver from a server based on system information of a client and information specific to a printer, and transmits the driver and installation information to the client (see Japanese Patent Application Laid-Open No. 2007-086969).

According to the method disclosed in Japanese Patent Application Laid-Open No. 2007-086969, an information table is held in the server, the printer automatically searches for and acquires the printer driver and related software that match with criteria, based on the system information of the client and the information specific to the printer. The printer causes the client to download the acquired printer driver and related software, printer driver information, and information on the related software, thereby allowing automatic installation.

However, some pieces of related software should be installed in a proper order. For instance, a port monitor is required to be installed before the printer driver is installed.

The method disclosed in Japanese Patent Application Laid-Open No. 2007-086969 cannot control the order for installing the plural pieces of related software.

Furthermore, some pieces of related software function in cooperation with a server. On such pieces of related software, server setting, such as the IP address of the server used for installation, is required. According to the method disclosed in Japanese Patent Application Laid-Open No. 2007-086969, arbitrary setting cannot be configured when installation is performed.

The above problems pertaining to installation of device drivers, such as conventional printer drivers, exist.

SUMMARY OF THE INVENTION

The present invention has been made to solve the above problems. It is an object of the present invention to provide a mechanism allowing a user to install device drivers, such as printer drivers, and related programs to be installed in an information processing apparatus in an appropriate order.

In order to solve the above problems, the present application provides a management apparatus for registering a device driver in a peripheral device, comprising: a first designation unit that designates (a) a first installer program for installing the device driver for the peripheral device in an information processing apparatus, and (b) at least one second installer program for installing a program related to the device driver in the information processing apparatus; a second designation unit that designates an activation order of the first and second installer programs designated by the first designation unit; a creation unit that creates a setup program including the designated first and second installer programs for activating the designated first and second installer programs in the activation order designated by the second designation unit; and a registration unit that registers the setup program created by the creation unit in a storage region in the peripheral device.

Further features of the present invention will become apparent from the following description of exemplary embodiments with reference to the attached drawings.

BRIEF DESCRIPTION OF THE DRAWINGS

FIG. 6 is a diagram illustrating an example of a driver download screen for an administrator of the present invention.

FIG. 14A is a diagram illustrating an example of a setup program of the present invention.

FIG. 14B is a diagram illustrating an example of a setup program of the present invention.

FIG. 15A is a diagram illustrating an example of a file describing information required on activation of a setup program and information required to create a download page according to the present invention.

FIG. 15B is a diagram illustrating an example of a file describing information required on activation of a setup program and information required to create a download page according to the present invention.

FIG. 16A is a diagram illustrating an example of a file describing information required by an installer of the present invention.

FIG. 16B is a diagram illustrating an example of a file describing information required by an installer of the present invention.

FIG. 16C is a diagram illustrating an example of a file describing information required by an installer of the present invention.

FIG. 25 is a diagram illustrating an example of software information held by a management application in Embodiment 2 of the present invention.

DESCRIPTION OF THE EMBODIMENTS

Preferred embodiments of the present invention will now be described in detail in accordance with the accompanying drawings.

Unless otherwise noted, in the present invention, a "printer driver" means software that is called from an OS (operating system) according to a print instruction from an application and generates a print data. A "logical printer" means a print queue on a spooler of the OS, and a printer as software. A "logical printer name" is a name identifying a logical printer. A "shared printer" is a logical printer that can cause a PC (personal computer) to which the "logical printer" is connected to function as a print server and can be used in common by PCs connected to a network, such as a LAN. A "port" is a collective name of any of network ports and local ports through which the logical printer transmits print data to the physical device. Typically, only one destination (e.g., IP address) of print data is mapped to one port. A "port name" is a name identifying a port. An "installer" is an application for installing a printer driver and related software, and includes information file describing an installation program and installation information. The installer of the printer driver can register a logical printer and create a port, when the printer driver is installed. "Upload" means registration of data in a storage region from one of the PCs and the server. "Download" means transfer of the data stored in the storage region to one of the PCs and the server.

For simplicity, description will be made using an example of an OS that is Windows (registered trademark) made by Microsoft Corporation. However, the present invention is applicable to another OS.

Embodiment 1

A system according to the embodiment 1 of the present invention will be described.

As an example of related software, software is adopted that acquires information (information may be any of user information and print history information of users) from a server and notifies a printer driver of the information acquired from the server. The printer driver uses the information, for generating a print job, and performs a high degree of print control. In the case of the software, setting of an access right and designation of a server to access are required on installation. For simplicity, in this embodiment, a case where only designation of the IP address of the server is required will be described. The present invention is also applicable to cases where another piece of information is required to be designated.

Figure 1:
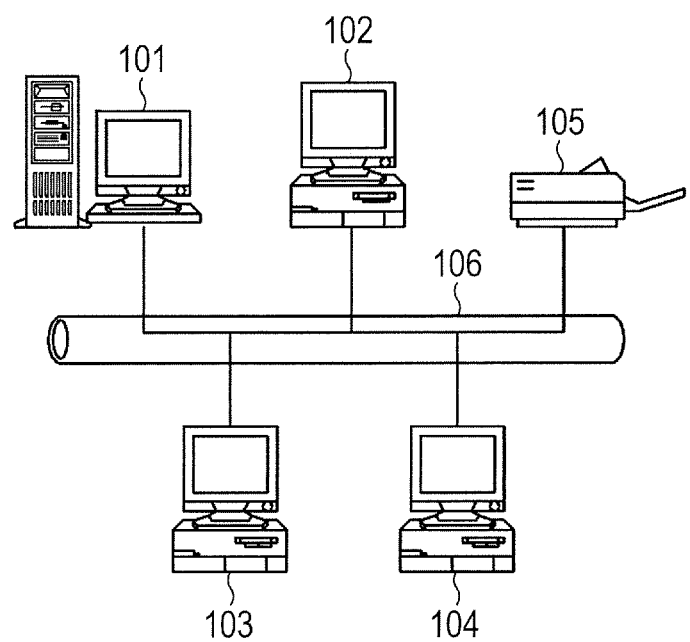
FIG. 1 is a block diagram illustrating an example of a configuration of a printing system to which the present invention is applicable.

FIG. 1 is a block diagram illustrating an example of the configuration of a printing system to which the present invention is applicable. Unless otherwise noted, it is a matter of course that the present invention is applicable even to any of a single apparatus and a system including apparatuses as long as the functions of the present invention are executed. Unless otherwise noted, it is a matter of course that the present invention is applicable even to systems that are connected through networks, such as LANs and WANs, and perform processes, as long as the functions of the present invention are executed.

In FIG. 1, information processing apparatuses 101 to 104 are connected to a network 106 through a network cable, such as of the Ethernet (registered trademark), (or wirelessly). The information processing apparatuses 101 to 104 can execute various programs, such as application programs, and include communication devices capable of bidirectionally communicating with the other devices connected to the network 106.

The information processing apparatus 101 is an information processing apparatus as a management apparatus. In the case of discriminating the apparatus 101 from the other information processing apparatuses, the apparatus 101 is called a management apparatus 101. The management apparatus 101 has functions that holds various pieces of information pertaining to a printer 105, and aggregates and holds a print log and an operation log of the printer.

The information processing apparatuses 102 to 104 are information processing apparatuses as personal client computers. Hereinafter, in the case where these apparatuses 102 to 104 are discriminated from the other information processing apparatuses, the apparatuses 102 to 104 are called clients. The following description will be made using the client 102. However, the description is applicable also to the clients 103 and 104.

The printer 105 is any of image forming apparatuses, such as printers and multi-function devices. The printer 105 is wiredly or wirelessly connected to the network 106 via a network interface, which is not illustrated. The printer 105 analyzes a job including a print data transmitted from any of clients 102, 103 and 104, converts the data into images on a page-by-page basis, and prints the images on the respective pages. The printer 105 may adopt any of printing schemes, such as of a laser beam printer employing electrophotography, an ink jet printer employing ink jetting, and a printer using thermal transfer.

Figure 2:
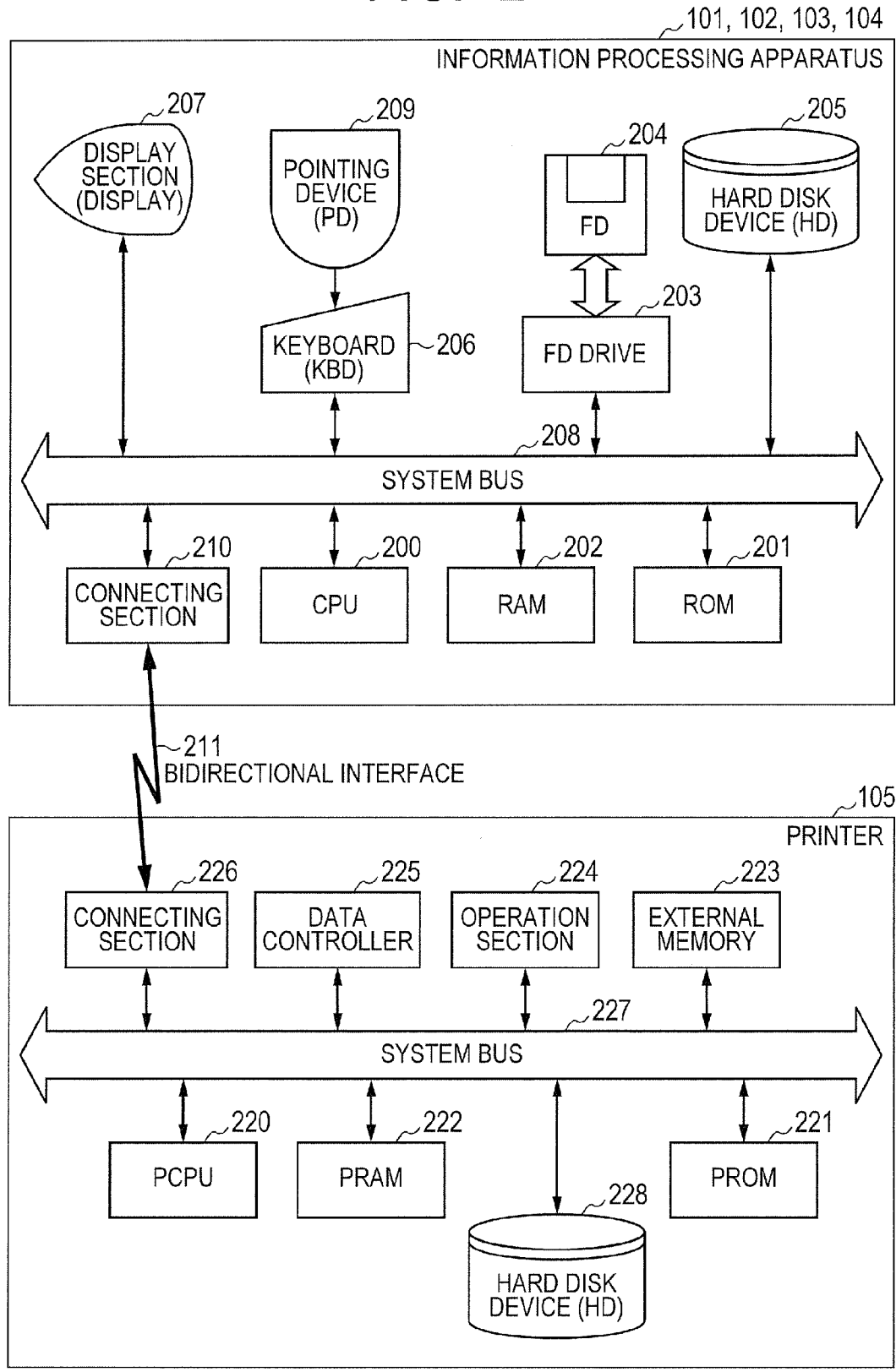
FIG. 2 is a block diagram illustrating an example of a detailed configuration of the printing system of the present invention.

FIG. 2 is a block diagram illustrating an example of the configurations of the information processing apparatuses 101 to 104 and the printer 105.

First, the detailed configurations of the information processing apparatuses 101 to 104 will be described. In the description of FIG. 2, the information processing apparatuses 101 to 104 are simply called the information processing apparatus.

In the information processing apparatus, a CPU 200 controls processes in the information processing apparatus. The CPU 200 executes application programs, printer driver programs, an OS and control programs that are recorded in a hard disk (HD) 205 in a computer-readable manner. The CPU 200 performs control of temporarily storing information and files required to execute programs in a RAM 202.

The ROM 201 is a memory in which various programs, such as basic I/O programs, font data used for document processing, and various data, such as data for templates, are recorded in a computer-readable manner. The RAM 202 is a temporal memory and functions as a main memory and a working area for the CPU 200.

An FD drive 203 is a recording medium reader. Through the FD drive 203, programs stored in a floppy (registered trademark) disk (FD) 204 which is a recording medium can be loaded into the information processing apparatus. The recording medium is not limited to FD. Instead, the medium may be any of a CD-ROM, CD-R, CD-RW, PC card, DVD, IC memory card, MO, and memory stick. In a recording medium, such as the FD 204, programs are recorded in a computer-readable manner.

The hard disk device (HD) 205 is one of external memories, and functions as a mass storage memory. In the HD 205, application programs, printer driver programs, the OS, control programs, and related programs are stored in a computer-readable manner. Furthermore, a spooler is secured in the HD 205. The spooler is a client spooler in a client, and a server spooler in a print server. As to the print server, job information received from the client is stored in the HD 205, and a table for order control is generated and also stored in the HD 205.

A keyboard (KBD) 206 and a pointing device (PD) 209 serve as an instruction input section for receiving input from a user. A display 207 is a display section on which commands input from the KBD 206 and the PD 209, and application programs, such as an after-mentioned device selection application, are displayed.

A system bus 208 administers the data flow in the information processing apparatus. A connecting section 210 exchanges data with an external device, such as the printer 105, via a bidirectional interface 211, such as the network 106.

Next, the detailed configuration of the printer 105 will be described.

The printer 105 includes a hard disk (HD) 228, a connecting section 226, a data controller (printer engine) 225, an operation section 224, an external memory 223, a PCPU 220, a PRAM 222 and a PROM 221, which are main configurational components. These configurational components are connected to each other via a system bus 227.

A printer CPU (PCPU) 220 administers the entire control of the printer 105. The PCPU 220 transmits an image signal to a data controller 225, based on control programs stored in one of an after-mentioned PROM 221 and external memory 223, according to the printer control command (transmitted data) received from the connecting section 226.

An HD 228 is a mass storage device. The HD 228 is used as a storage in which data, such as font data and print jobs, are stored. The HD 228 can be replaced with a storage device as an external device, not illustrated. In the case of replacing the HD 228 with an external storage device, the printer 105 transmits and receives data via the connecting section 226.

A PRAM 222 includes, as a main memory of the PCPU 220, a temporary storage region for various data that is used as a working data area during control by the PCPU 220. An external memory 223 is connected also as an optional component, and stored with font data, emulation programs and form data.

The PROM 221 is a printer internal memory, and stored with various data and printer control programs for controlling this printer, in a manner analogous to that of the external memory.

The data controller 225 is a printer engine, controlled by the PCPU 220, receives an image signal output through the system bus 227 and performs an actual printing process according to control programs stored in one of the PROM 221 and the external memory 223.

An operation section 224 includes an input section, such as an operation panel and an operation switch, and a display, such as LED and a liquid crystal panel, and receives an operation by an operator and displays a result. The operator can issue an instruction on printer setting via the operation section 224 and verify the setting.

A connecting section 226 is connected to the connecting section 210 of the information processing apparatus via the bidirectional interface 211, and can receive print control commands (transmitted data) and notify the internal state of the printer.

Figure 3:
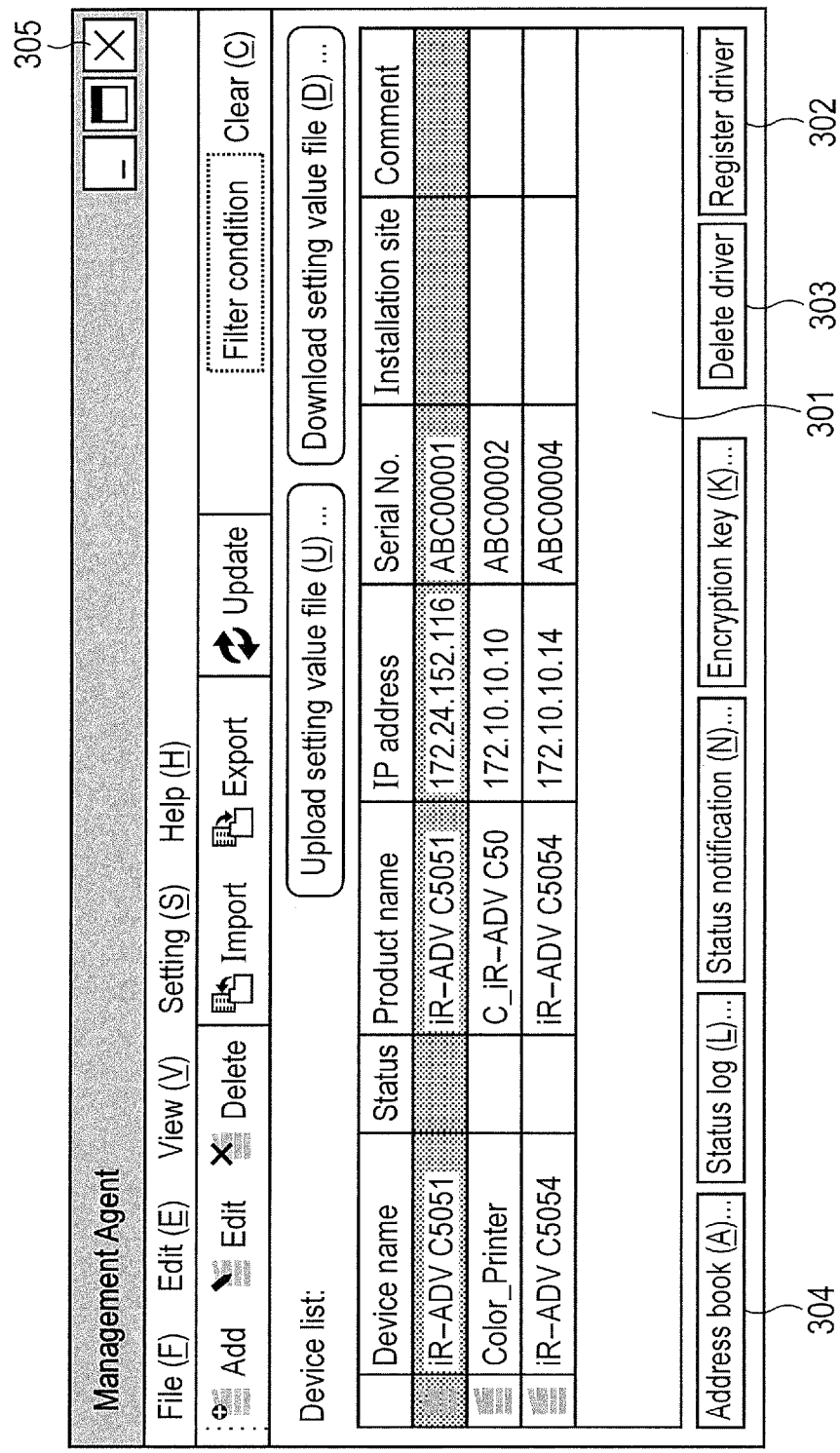
FIG. 3 is a diagram illustrating an example of a device selection screen of the present invention.

FIG. 3 is a diagram illustrating an example of a device selection screen provided by a management application executed by the management apparatus 101 of this embodiment. This screen is displayed on the display 207 of the management apparatus 101. The CPU 200 of the management apparatus 101 reads and executes a management application program recorded in the HD 205 of the management apparatus 101 in a computer-readable manner, thereby realizing the management application.

The management application executed by the management apparatus 101 can additionally register a device, such as the printer 105, under control, according to an operation by the user. As illustrated in FIG. 3, the management application displays the device that is under control, together with appended information, such as a device name, status, product name, IP address, serial No., installation site, and comment, in a list form of a device list 301. The device under control may be any of peripheral devices, such as a printer having a printing function, and a multi-function device having scanner, fax and copying functions.

The devices listed in the device list 301 are controlled to be selected (one or a plurality of devices can be selected) by the management application through any of the PD 209 and KBD 206. When one or a plurality of devices is selected by a user from among the devices displayed on a list form of the device list 301 and a "Register driver" button 302 is pressed, the management application displays a screen of setting an upload condition, which will be illustrated later in FIG. 4, on the display 207 of the management apparatus 101.

When the user presses one of the buttons, such as an "Address book" button 304 and a "Delete driver" button 303, the management application displays one of an address book screen and a driver deleting screen, which are not illustrated, on the display 207 of the management apparatus 101.

In the description of this embodiment, the "printer driver" is used as an example of a device driver (hereinafter, called a driver) covered by the present invention. However, the "driver" is not limited to the printer driver. In the case where the printer 105 has a scanning function, a scanner driver is adopted. In the case where the printer 105 has a fax function, a fax driver is adopted. Thus, any device driver may be adopted as long as the driver is for the printer 105. The printer 105 may be another peripheral device, such as a scanner.

Figure 4:
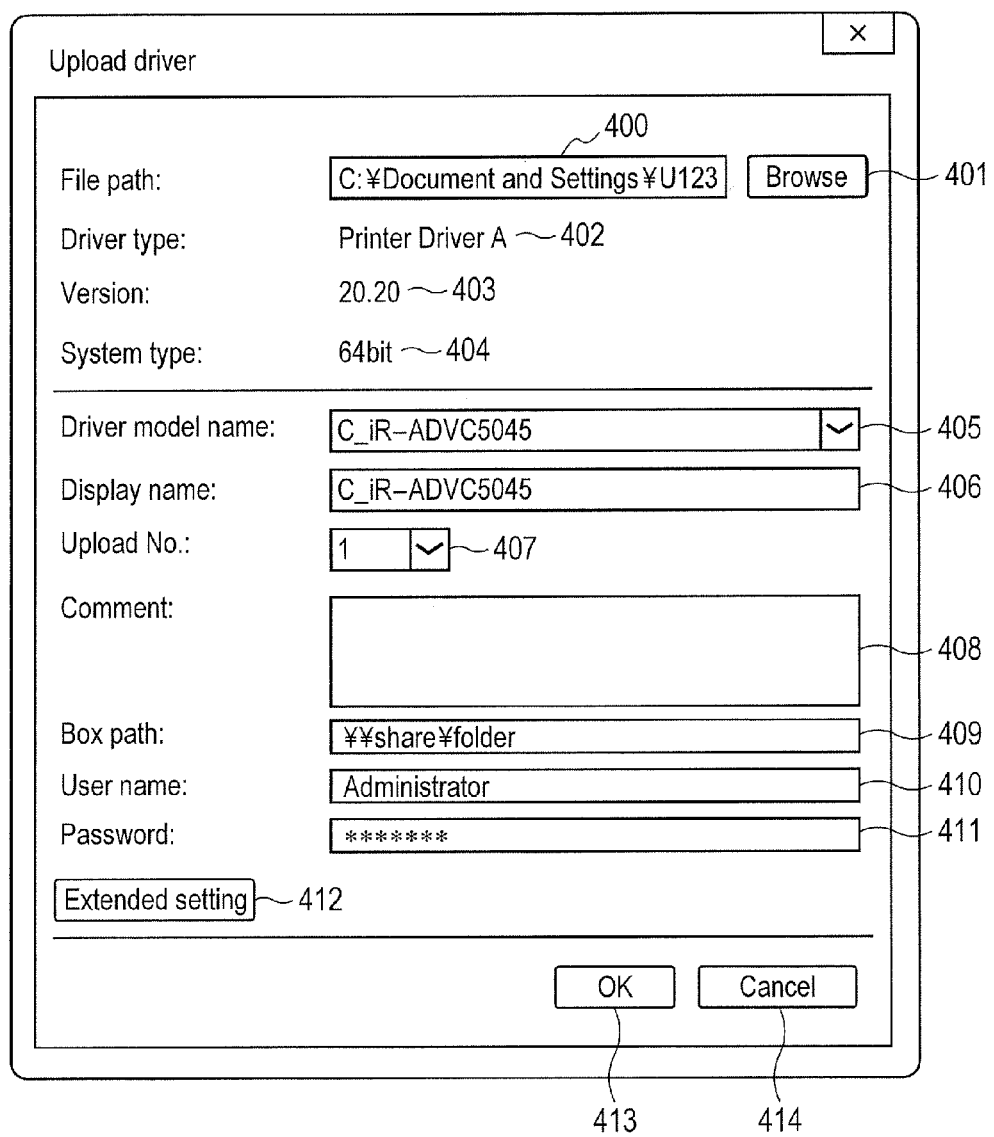
FIG. 4 is a diagram illustrating an example of an upload condition setting screen (for a printer driver) of the present invention.

FIG. 4 is a diagram illustrating an example of an upload condition setting screen (for the printer driver) provided by the management application executed on the management apparatus 101 of this embodiment. This screen is displayed on the display 207 of the management apparatus 101.

In this upload condition setting screen (for the printer driver), when a "Browse" button 401 is pressed by the user, the management application displays a file selection dialog, not illustrated, on the display 207 of the management apparatus 101. When a "setup.exe" file for an installer is selected by the user from the file selection dialog, the management application reflects path information of the file of the designated "setup.exe" in a "file path" text area 400. The management application reads the driver type, version, and system type of the installer from the designated "setup.exe" file and the accompanying file. The management application further reflects the read driver type and version in text areas of "Driver type:" 402, "Version:" 403 and "System type:" 404 on the upload condition setting screen (for the printer driver).

Furthermore, the management application compares the model name of the device (the printer; the first one if a plurality thereof is selected) designated on the device selection screen illustrated in FIG. 3, from the list of the driver models held by the selected installer, and displays matching one on a "Driver model name" combo box 405.

Moreover, the management application sets the driver model name set in the "driver model" combo box 405, as an initial value of a "Display name" text box 406. The "Display name" text box 406 can be edited to be any character string by the user. The character string designated in the "Display name" text box 406 is displayed in a driver download page illustrated in after-mentioned FIG. 6, to allow the user downloading the setup program from the printer 105 to easily recognize a target driver at the client 102.

In an "Upload No." combo box 407, the management application permits the user to designate an upload number where the setup program to be uploaded is stored. Any of numbers "1" to "3" can be designated as the upload number. A storing region corresponding to the upload number is preliminarily secured in the HD 228 of the printer 105. When the upload number having already been stored in the printer 105 by the setup program is designated and uploading is performed, the existing setup program is disabled and the newly uploaded setup program is enabled.

The management application enables the user to input any comment in a "Comment" text box 408. The character string designated (input) here is displayed on an after-mentioned driver download page (FIG. 6), to allow the user performing downloading to easily recognize a target driver. The character string designated (input) here is added as a comment to the property of a logical printer created in the client 102.

In a "Box path" text box 409, the management application enables the user to designate the path of a shared folder in the storage device of the printer 105 into which the setup program is uploaded.

In a "User name" text box 410, the management application allows designation by the user having a user name with an access right to the path designated in the "Box path" text box 409.

In a "Password" text box 411, the management application enables the user having an access right to the path designated in the "Box path" text box 409 to designate a password.

Figure 5:
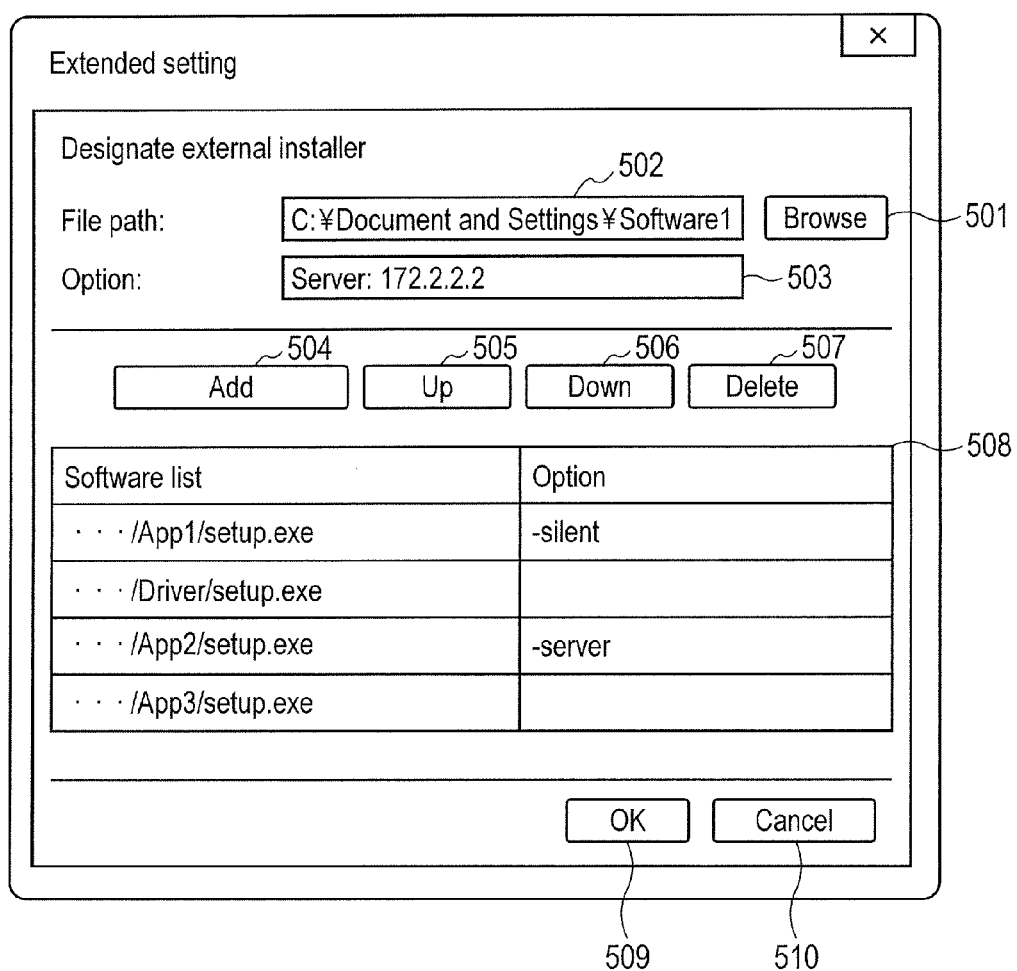
FIG. 5 is a diagram illustrating an example an upload condition setting screen (for related software) of the present invention.

When the user presses an "Extended setting" button 412, the management application displays the upload condition setting screen (for the related software) illustrated in FIG. 5 on the display 207 of the management apparatus 101. On an upload screen (related software) of FIG. 5, the user can add an installer for the related software to be added to the setup program.

When an "OK" button 413 is pressed on the upload condition setting screen (for the printer driver), the management application constructs the installer designated in the file selection dialog where the setting of the display name 406 and the upload number 407 are reflected, the installer for the related software selected on the upload condition setting screen (for the related software) of FIG. 5, and the setting information set by the user, as a setup program. The management application uploads the setup program to the HD 228 of each printer designated on the device selection screen illustrated in FIG. 3.

When a "Cancel" button 414 is pressed on the upload condition setting screen (for the printer driver), the management application closes the upload condition setting screen (for the printer driver) without uploading the setup program.

In the case where a plurality of devices (printers) is designated on the device selection screen illustrated in FIG. 3, each upload condition set on the upload condition setting screen (for the printer driver) of FIG. 4 is shared and used by the selected devices.

FIG. 5 is a diagram illustrating an example of the upload condition setting screen (for the related software) provided by the management application executed on the management apparatus 101 of this embodiment. This screen is displayed on the display 207 of the management apparatus 101. The upload screen (related software) is for setting the upload condition of software.

When a "Browse" button 501 on the upload condition setting screen (for the related software) is pressed by the user, the management application displays a file selection dialog, not illustrated, on the display 207 of the management apparatus 101. When the user designates the file (setup.exe) of the related software from the file selection dialog, the management application reflects the path information of the designated file of the related software in a "file path" text area 502.

In an "Option" text box 503, the management application enables the user to input setting information set in the related software selected from the "Browse" button 501. The setting information input here is used as setting information when the setup program installs the related software.

When an "Add" button 504 is pressed, the management application pairs the setup.exe of the related software selected from the "Browse" button 501 with the setting information input from the "Option" text box 503, and adds the pair to the end of an after-mentioned "Software list" 508.

In the "Software list" 508, the management application displays the setup.exe for the printer driver set on the upload condition setting screen (for the printer driver) of FIG. 4, and the setup.exe for the related software added from the "Add" button 504 in a selectable manner from one of the PD 209 and the KBD 206.

When the management application adds the information of the related software to the "Software list" 508, this application creates activation order information for the software based on the order of the software displayed on the "Software list" 508, and stores the information in a prescribed working area of the storage device, such as the RAM 202.

When an "Up" button 505 is pressed, the management application moves the display position of the software selected at the "Software list" 508 upward by one. When a "Down" button 506 is pressed, the management application moves the display position of the software selected at the "Software list" 508 downward by one. When a "Delete" button 507 is pressed, the management application deletes the software selected in the "Software list" 508 from the "Software list" 508.

After the order of the software displayed on the "Software list" 508 is updated, the management application updates the activation order information of the software stored in the prescribed working area of the storage device, such as the RAM 202. The activation order information of the software is used for determining the installation order when the setup application is created.

When an "OK" button 509 is pressed on the upload condition setting screen (for the related software), the management application returns the control to the upload condition setting screen (for the printer driver) of FIG. 4 in the state where the activation order information of the software is held.

When a "Cancel" button 510 is pressed on the upload condition setting screen (for the related software), the management application discards the activation order information of the software and returns the control to the upload condition setting screen (for the printer driver) of FIG. 4.

FIG. 6 is a diagram illustrating an example of a driver download screen displayed on the display 207 of an access originator when the user accesses the web server included in the printer 105 of this embodiment from the web browsers of the clients 102 to 104.

A web server function section 705 (after-mentioned FIG. 7) of the printer 105 displays a login screen, not illustrated, on web browsers 720 (FIG. 7) of the clients 102 to 104, and accepts input of the user name from the user. The web server function section 705 of the printer 105 determines the user name acquired from the login screen according to an right determination function preliminarily provided in the web server function section 705. If the acquired user name is an administrative user, the download screen for the administrator of FIG. 6 is transmitted to the web browser of the access originator to be displayed thereon. If the acquired user name is a general user, a download screen for a general user, not illustrated, is transmitted to the web browser of the access originator to be displayed thereon.

On the download screen for the administrator of FIG. 6, a list 601 of the uploaded setup program is displayed, together with "No.", "Display name", "Driver type", "Version", "System type", "Path", "Comment", and various operation buttons (602 and 603). On the download screen for a general user, not illustrated, the "Path" and "Delete" button 603 are not displayed.

In the list 601, "No." is for displaying the upload number designated in the "Upload No." 407 in FIG. 4. "Display name" is for displaying the character string designated at the "Display name" 406 in FIG. 4. "Driver type" is for displaying the character string set in the "Driver type" 402 in FIG. 4. "Version" is for displaying the character string set in the "Version:" 403 in FIG. 4. "System type" is for displaying the value displayed in "System type" 404 in FIG. 4. "Path" is for displaying the character string designated in the "Box path" 409 in FIG. 4. "Comment" is for displaying the character string designated in the "Comment" 408 in FIG. 4.

The various operation buttons are a "Download" button 602 and a "Delete" button 603. The "Delete" button 603 is displayed only on the down load screen for the administrator.

Here, when the "Download" button 602 on any row of the list 601 is pressed by the user, the operating web browser displays a download dialog, not illustrated, and starts downloading the setup program. The setup program is downloaded in a download directory designated by the download dialog by the user.

When the "Delete" button 603 on any row of the list 601 is pressed here by the user, the operation is notified by the operating web browser to the web server function section 705 of the printer 105. The notified web server function section 705 issues a delete instruction to the monitoring section 703 (FIG. 7), thereby causing the setup program updater 704 (FIG. 7) instructed by the monitoring section 703 to delete the setup program on the row concerned. The list 601, where the setup program on the row concerned is deleted, is displayed on the operating web browser.

Figure 7:
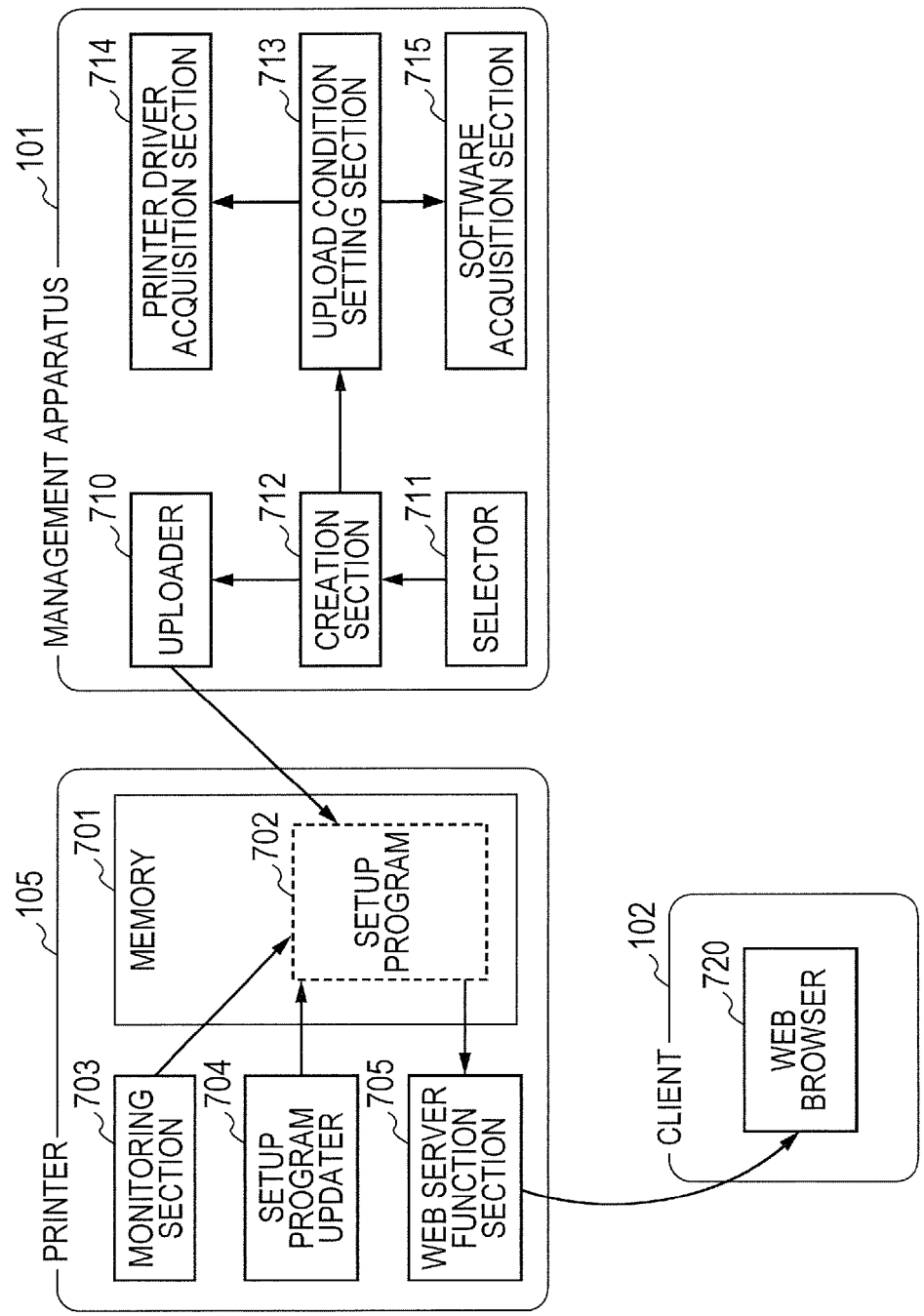
FIG. 7 is a diagram illustrating an example of a main module configuration of the printing system of the present invention.

FIG. 7 is a diagram illustrating an example of a main module configuration of the printing system of this embodiment. The module is a logical configuration for providing functions realized by the CPU executing the programs in each apparatus in the system.

First, the module configuration of the management apparatus 101 will be described.

The management apparatus 101 includes an uploader 710, a selector 711, a creation section 712, an up load condition setting section 713, a printer driver acquisition section 714, and a related software acquisition section 715. These modules 710 to 715 correspond to the respective functions of the management application realized by the CPU 200 of the management apparatus 101 reading and executing the management application program recorded in the ROM 201 in a computer-readable manner.

The selector 711 displays the screen (FIG. 3) provided by the management application, on the display 207 of the management apparatus 101.

The upload condition setting section 713 displays the upload condition setting screens (FIGS. 4 and 5) on the display 207 of the management apparatus 101.

The printer driver acquisition section 714 is activated by the upload condition setting section 713, and reads the installer program (setup.exe) for the pr inter driver and the driver information file (setup.inf) from the file path designated from the upload condition setting screen (FIG. 4), thereby acquiring the printer driver.

The related software acquisition section 715 is activated by the upload condition setting section 713, and reads the installer program (setup.exe) for the related software and the setting information to be set in the related software, from the file path designated by the upload condition setting screen (FIG. 5), thereby acquiring the related software.

The creation section 712 acquires setting information required for registration of the logical printer and the related software from the upload condition setting section 713, into the installer acquired by the printer driver acquisition section 714 and the related software acquisition section 715, thereby creating the setup program. The uploader 710 transmits the setup program created by the creation section 712 to the memory 701 of the printer 105. The creation section 712 is activated by the uploader 710.

Next, the module configuration of the printer 105 will be described.

The printer 105 includes the memory 701, the monitoring section 703, the setup program updater 704 and the web server function section 705. The modules 701 and 703 to 705 correspond to the respective functions realized by the PCPU 220 of the printer 105 reading and executing the program recorded in the PROM 221 in a computer-readable manner.

The memory 701 receives the setup program transmitted from the uploader 710 of the management apparatus 101, and stores the program in the storage region preliminarily secured in the storage device (the HD 228 of the printer 105). The memory 701 receives information identifying the stored setup program, as a delete request, from the information processing apparatus, and deletes the setup program concerned.

The setup program 702 is an execution program including an installer and various settings required for creating a logical printer.

The monitoring section 703 monitors configuration information of the printer 105. When the configuration information is changed, the monitoring section 703 requests update of the setup program 702 from the setup program updater 704. The configuration information is set in the printer 105, including information on, for instance, the IP address, the host name, the device name and the installation site. The monitoring section 703 monitors uploading of the setup program from the management apparatus 101 and the delete instruction of the registered setup program.

The setup program updater 704 rewrites internal information of the setup program 702, based on the instruction from the monitoring section 703.

The web server function section 705 functions as a web server, and provides various web pages including the driver download screen illustrated in FIG. 6 for the clients 102 to 104.

Next, the module configuration of the client 102 (103, 104) will be described.

The client 102 (103, 104) includes the web browser 720. The web browser 720 corresponds to the function realized by the CPU 200 of the client 102 (103, 104) reading and executing the program recorded in the ROM 201 in a computer-readable manner.

The web browser 720 accesses the web server function section 705 of the printer 105 and downloads the setup program 702 according to the instruction by the user.

Figure 8:
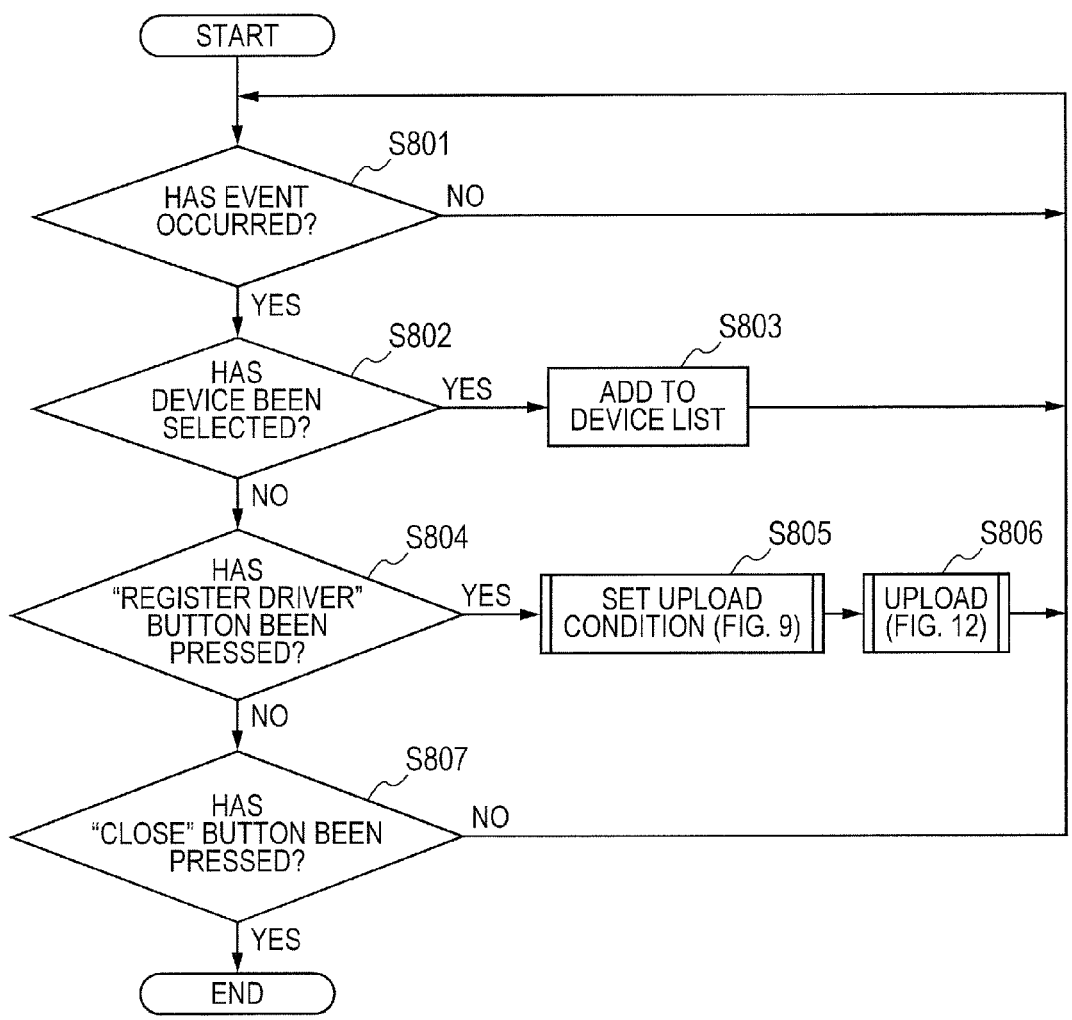
FIG. 8 is a flowchart illustrating an example of processes executed by a selector 711 of a management apparatus 101.

Processes executed by the selector 711 will hereinafter be described using the flowchart in FIG. 8. FIG. 8 is a flowchart illustrating an example of the processes executed by the selector 711 of the management apparatus 101. The program for executing the processes illustrated in FIGS. 8 to 13 (the management application program) is pre-installed in the HD 205 of the management apparatus 101, called into the RAM 202, and executed by the CPU 200.

In this embodiment, it is provided that all the devices registered and managed by the device selection screen illustrated in FIG. 3 are printers.

First, in S801, the selector 711 determines whether an event has occurred or not. For instance, according to a method disclosed in MSDN Library (registered trademark) by Microsoft Corporation, operations including clicks by the mouse and keyboard input, and IDs uniquely identifying the resources including buttons and list boxes in a window are notified as events, based on which determination is to be made.

If it is determined that no event has occurred (No) in S801, the selector 711 repeats the processing in S801.

In contrast, if it is determined that an event has occurred (Yes) in S801, the selector 711 advances the processing to S802.

In S802, the selector 711 determines whether the event having occurred is "device selection" or not. In this embodiment, if the event having occurred includes the ID of a record in the device list 301 on the device selection screen illustrated in FIG. 3 and a left mouse button operation, it is determines that "device selection" has been performed.

If it is determined that the event is the device selection (Yes) in S802, the selector 711 advances the processing to S803.

In S803, the selector 711 adds are cord corresponding to the selected device, to the device list in the working area preliminarily secured in the storage device, such as the RAM 202 and the HD 205. On the device selection screen of FIG. 3, a plurality of peripheral devices (devices) whose device drivers are to be registered can be designated, these devices are held in the device list. The device list includes information specific to the printer, such as the device model name, the IP address, and the serial number of the selected device. The selector 711 returns the processing to S801.

In contrast, if it is determined that the event is not device selection (No) in S802, the selector 711 advances the processing to S804.

In S804, the selector 711 determines whether or not the event having occurred is a press of the "Register driver" button 302. In this embodiment, if the event includes the ID indicating the "Register driver" button 302 on the device selection screen illustrated in FIG. 3 and a left mouse button operation, it is determined that the "Register driver" button 302 has been pressed.

If it is determined that the event having occurred is a press of the "Register driver" button 302 (Yes) in S804, the selector 711 passes the device list created in S803 to the upload condition setting section 713. Based on the device list, the upload condition setting section 713 displays the upload condition setting screen (for the printer driver) illustrated in FIG. 4, and executes an up load condition setting process in S805. After the upload condition setting process is completed, the installer acquired through the upload condition setting process by the printer driver acquisition section 714 and the related software acquisition section 715 is passed to the selector 711, and the control is returned to the selector 711.

In S806, the selector 711 calls the uploader 710. The selector 711 passes the de vice list created in S803, the upload condition set in the upload condition setting process in S805, the installer program for the printer driver, and the installer program for the related software, to the uploader 710.

Figure 9:
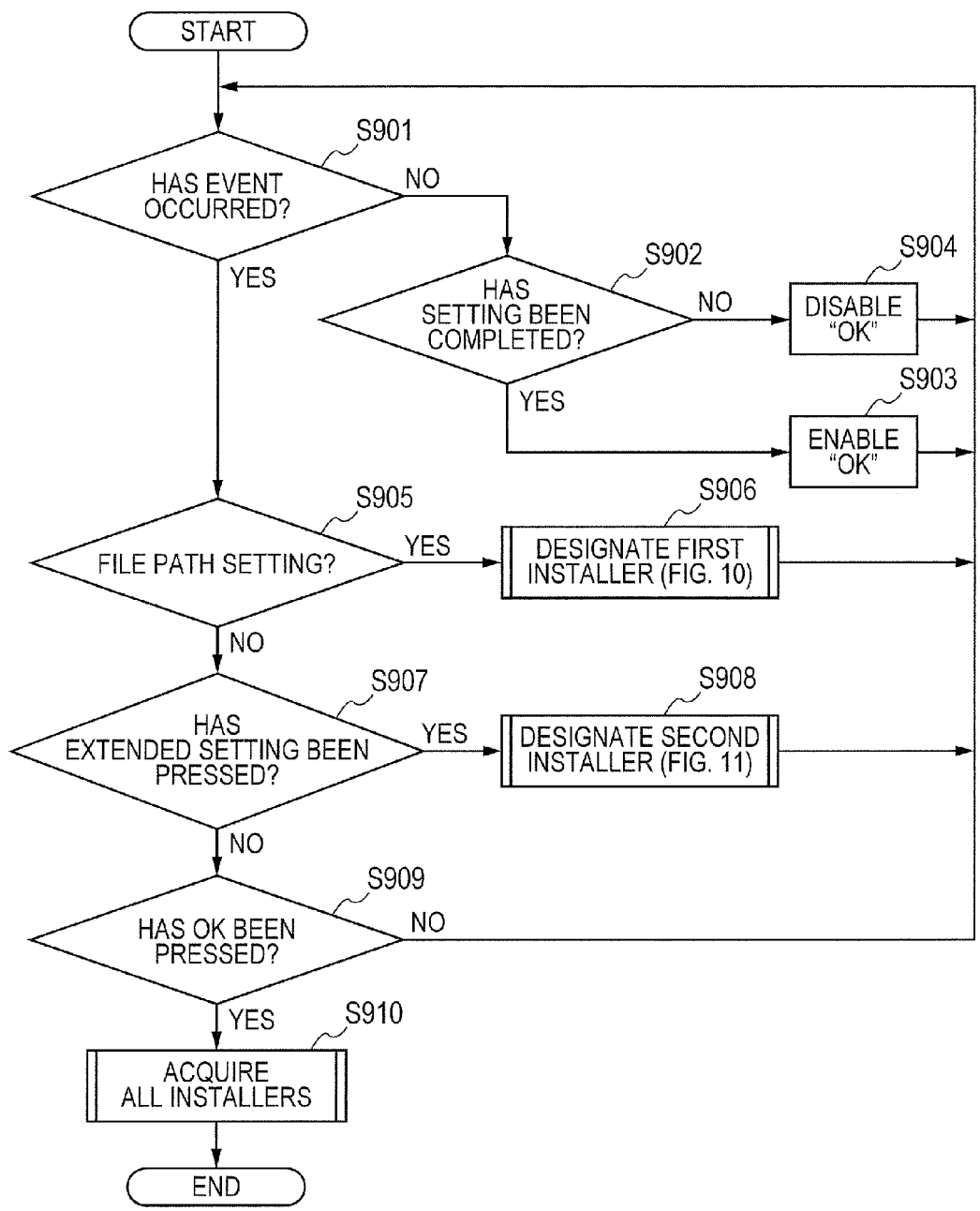
FIG. 9 is a flowchart illustrating an example of an upload condition setting process of the present invention.

The uploader 710 executes the upload process (FIG. 9). In this upload process, according to an instruction from the uploader 710, the creation section 712 creates the setup program using the upload condition, the installer program for the printer driver and the installer program for the related software. The uploader 710 transmits the setup program to the devices listed in the device list. After completion of the upload process, the control is returned to the selector 711. The selector 711 returns the processing to S801.

If it is determined that the event having occurred is not a press of the "Register driver" button 302 (No) in S804, the selector 711 advances the processing to S807.

In S807, the selector 711 determines whether the event having occurred is a press of the "Close" button 305 or not. In this embodiment, if the event includes the ID of the "Close" button 305 on the device selection screen illustrated in FIG. 3 and a left mouse button operation, the event is determined as a press of the close button 305.

If it is determined that the event having occurred is not a press of the "Close" button 305 (No) in S807, the selector 711 then determines that another operation has been performed and returns the processing to S801. Here, description on the other operation is omitted.

In contrast, if it is determined that the event having occurred is a press of the "Close" button 305 (Yes) in S807, the selector 711 releases the working area secured in the storage device, such as the RAM 202 and the HD 205 of the management apparatus 101, according to prescribed procedures, and performs a finishing process.

Next, the upload condition setting process in S805 in FIG. 8 will be described using FIG. 9.

FIG. 9 is a flowchart illustrating an example of the upload condition setting process in S805 in FIG. 8. The process is started in a state where the upload condition setting screen (for the printer driver) illustrated in FIG. 4 is displayed. It is provided that the device list created in S803 in FIG. 8 has been passed from the selector 711.

First, in S901, the upload condition setting section 713 determines whether an event has occurred or not.

If it is determined that no event has occurred (No in S901), the upload condition setting section 713 advances the processing to S902.

In S902, the upload condition setting section 713 determines whether setting has been completed or not. In this embodiment, the upload condition setting screen (printer driver) illustrated in FIG. 4 is searched. If values have already been set in all the items, it is determined that setting has been completed.

If it is determined that setting has not been completed yet (No) in S902, the upload condition setting section 713 advances the processing to S904.

In S904, the upload condition setting section 713 disables the "OK" button 413 on the setting screen illustrated in FIG. 4, and advances the processing to S901. Note that the disablement displays the text in the button in gray and sets an event of a press of the button to be incapable of being notified, using a function included in the OS.

In contrast, if it is determined that setting has been completed (Yes) in S902, the upload condition setting section 713 advances the processing to S903.

In S903, the upload condition setting section 713 enables the "OK" button 413 on the setting screen illustrated in FIG. 4 and advances the processing to S901. Note that the enablement displays the text in the button in black and sets an event of a press of the button to be capable of being notified, using a function included in the OS.

If it is determined that an event has occurred (Yes) in S901, the upload condition setting section 713 advances the processing to S905.

In S905, the upload condition setting section 713 determines whether the event is file path setting or not. In this embodiment, if the event includes the ID indicating the "Browse" button 401 on the setting screen illustrated in FIG. 4 and the left mouse button operation, it is determined that the event is "file path setting".

If it is determined that the event is file path setting in (Yes) S905, the upload condition setting section 713 advances the processing to S906.

Figure 10:
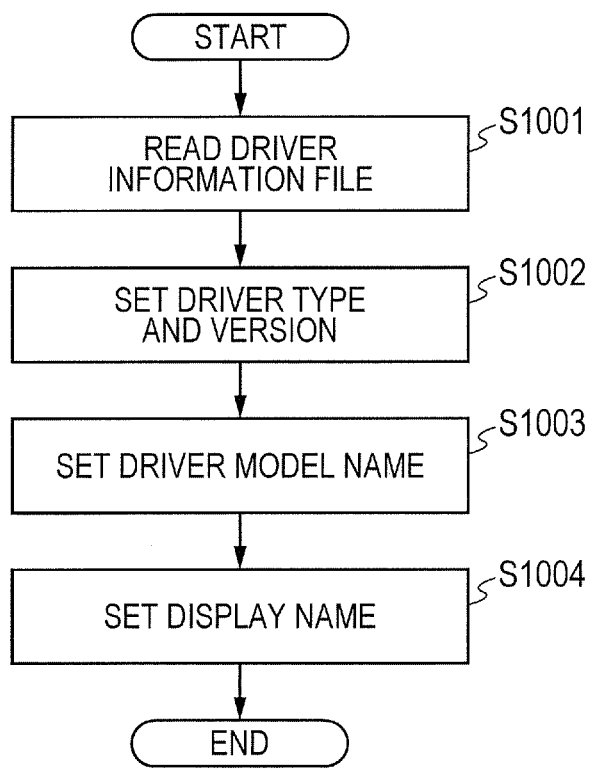
FIG. 10 is a flowchart illustrating an example of a first installer designation process of the present invention.

In S906, the upload condition setting section 713 calls the printer driver acquisition section 714. At this time, the upload condition setting section 713 passes the device list (the device list created in S803 in FIG. 8) to the printer driver acquisition section 714. The printer driver acquisition section 714 performs an after-mentioned first installer designation process (FIG. 10). After completion of the first installer designation process, the control is returned to the upload condition setting section 713. The upload condition setting section 713 returns the processing to S901.

In contrast, if it is determined that the event is not file path setting in (No) S905, the upload condition setting section 713 advances the processing to S907.

In S907, the upload condition setting section 713 determines whether the event is a press of the "Extended setting" button 412 or not. In this embodiment, if the event includes the ID indicating the "Extended setting" button 412 on the setting screen illustrated in FIG. 4 and a left mouse button operation, it is determined that the "Extended setting" button 412 has been pressed. Although not illustrated in FIG. 9, the "Extended setting" button 412 is enabled after completion of the first installer designation process in S906.

If it is determined that the event is a press of the "Extended setting" button 412 (Yes) in S907, the upload condition setting section 713 advances the processing to S908.

Figure 11:
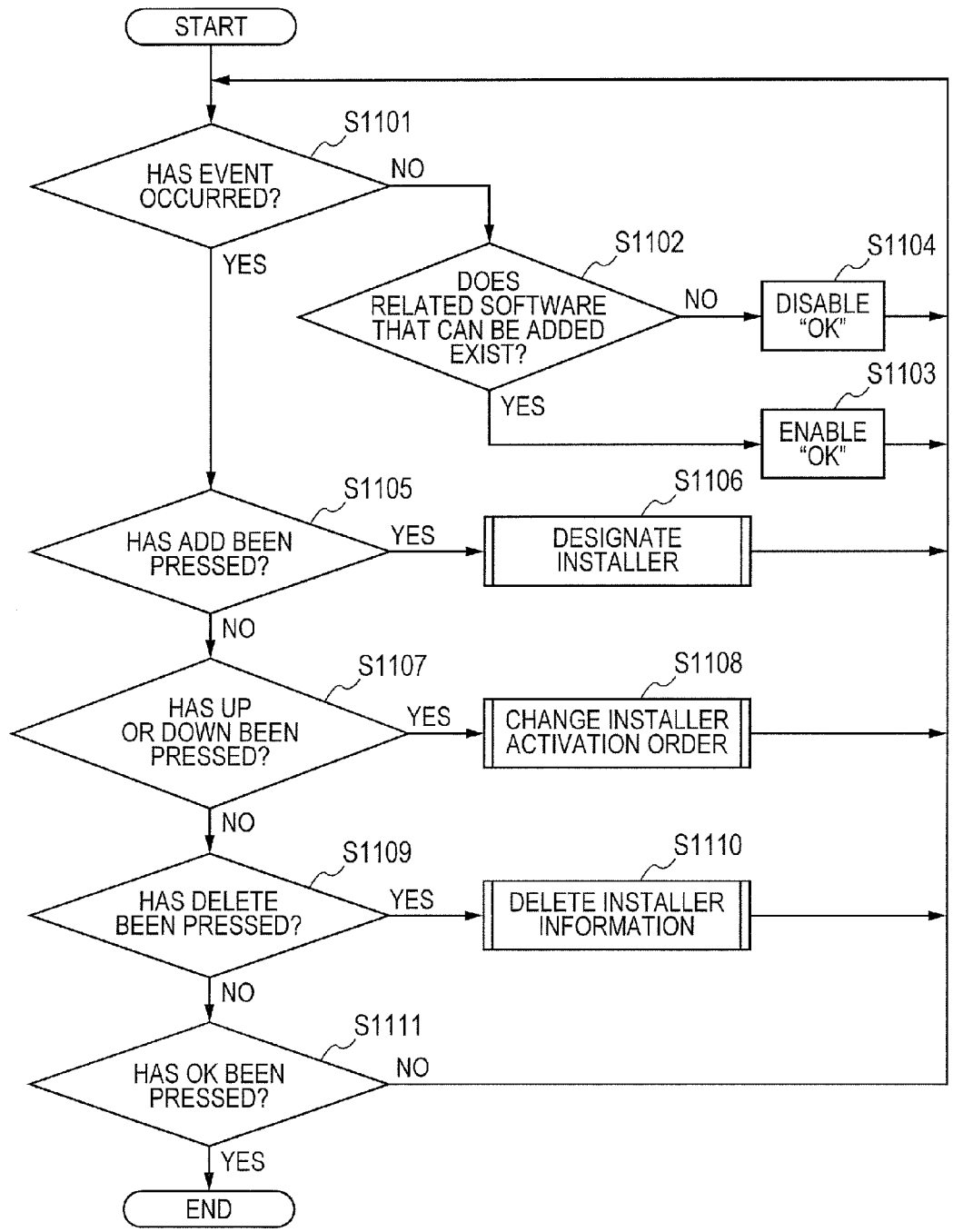
FIG. 11 is a flowchart illustrating an example of a second installer designation process of the present invention.

In S908, the upload condition setting section 713 displays the upload condition setting screen (for the related software) illustrated in FIG. 5, and executes an after-mentioned second installer designation process (FIG. 11). After completion of the second installer designation process, the upload condition setting section 713 returns the processing to S901.

In contrast, if it is determined that the event is not a press of the "Extended setting" button 412 (No) in S907, the upload condition setting section 713 advances the processing to S909.

In S909, the upload condition setting section 713 determines whether the event is a press of the "OK" button 413 or not. In this embodiment, if the event includes the ID indicating the "OK" button 413 on the setting screen illustrated in FIG. 4 and a left mouse button operation, it is determined that the "OK" button has been pressed.

If it is determined that the event is not a press of the "OK" button 413 (No) in S909, the upload condition setting section 713 returns the processing to S901.

In contrast, if it is determined that the event is a press of "OK" button 413 (Yes) in S909, the upload condition setting section 713 advances the processing to S910.

In S910, first, the upload condition setting section 713 instructs the printer driver acquisition section 714 and the related software acquisition section 715 to acquire all the installers based on the paths of the installers designated in S906 and S908, and stores the installers in the working area secured in the storage device, such as the RAM 202. The printer driver acquisition section 714 acquires the installer program for the printer driver (setup.exe) through the file path set in the "file path" text area 400 in FIG. 4 according to the instruction from the upload condition setting section 713, and stores the program in the RAM 202. The related software acquisition section 715 acquires all the installer programs for the related software (setup.exe) according to an instruction from the upload condition setting section 713 based on the path information of the installer in the "Software list" 508 in FIG. 5, and stores the programs in the RAM 202. Next, the upload condition setting section 713 stores the upload condition set on the setting screen illustrated in FIG. 4 and the setting screen illustrated in FIG. 5 in the working area secured in the storage device, such as the RAM 202, and finishes the upload condition setting process of this flowchart. Thus, the control is returned to the selector 711.

That is, the upload condition setting process (particularly in S906 and S908) in FIG. 9 performs a first designation process that designates a first installer program for installing the printer driver for the printer in the information processing apparatus and also designates at least one second installer program for installing a program related to the printer driver in the information processing apparatus, and a second designation process that designates an activation order of the first installer program and the second installer program designated in the first designation process.

Next, the first installer designation process illustrated in S906 in FIG. 9 will be described using FIG. 10.

FIG. 10 is a flowchart illustrating an example of the first installer designation process illustrated in S906 in FIG. 9. This process is executed by the printer driver acquisition section 714. It is provided that the device list created in S803 in FIG. 8 has already been passed from the upload condition setting section 713.

In S1001, the printer driver acquisition section 714 reads the driver information file. In detail, the printer driver acquisition section 714 acquires the path information of the "setup.exe" designated by the user from the file selection dialog, not illustrated, and searches for the driver information file (setup.inf) of the printer driver on and below the path. If the driver information file is found, the printer driver acquisition section 714 searches the driver information file according to a prescribed format, reads the driver type, the version information and the system type, and stores the read data in the prescribed working area in the storage device, such as the RAM 202.

Next, in S1002, the printer driver acquisition section 714 writes the driver type, the version information and the system type acquired in S1001, in the "Driver type:" text area 402, the "version information:" text area 403, and "System type:" text area 404 in the upload condition setting screen (FIG. 4), respectively.

Next, in S1003, the printer driver acquisition section 714 sets the driver model name. In detail, the printer driver acquisition section 714 searches the driver information file read in S1001, and acquires the driver model name suitable for the device. For instance, methods disclosed in the MSDN Library (registered trademark) of Microsoft Corporation include a method of describing the driver model name and the hardware ID as one entry in a model section for the driver information file (INF file). Through use of this information, the driver model name suitable for the device is acquired. In this embodiment, this method searches the entire driver information file found in S1001 for description identical to the hardware ID of the device (the top device in the device list created in S803 in FIG. 8). The found driver model name is registered as an entry of the list in the "driver model name" combo box 405 on the upload condition setting screen (FIG. 4) displayed on the display 207. On the upload condition setting screen (FIG. 4), the driver model name as the top candidate of the list is set to a selected status. If the driver model name is not found, all the driver model names described in the driver information file are registered as entries in the list of the "driver model name" combo box 405. In this case, at the initial state, a state where no driver model is selected is displayed on the upload condition setting screen. The driver model name used in this step is the driver model name (i.e., the driver model name for the top device in the device list generated in S803 in FIG. 8) for the top device selected from the device list 301 displayed by the management application in FIG. 3.

Next, in S1004, the printer driver acquisition section 714 sets the information of the "driver model name" combo box 405 set in S1003 into the "Display name" text box 406, and finishes the processes in this flowchart. Thus, the control is returned to the upload condition setting section 713.

Next, the second installer designation process illustrated in S908 in FIG. 9 will be described using FIG. 11.

FIG. 11 is a flowchart illustrating an example of the second installer designation process illustrated in S908 in FIG. 9. This flow is executed by the upload condition setting section 713. The second installer designation process sets the up load condition of the related software. The upload condition includes the path of the installer, the setting information of the installer, and the activation order information of the installer. Here, the activation order information indicates an activation order including all the installers for the printer drivers and the related software used in the setup program. This process is started in a state where the upload condition setting screen (for the related software) illustrated in FIG. 5 is displayed.

In S1101, the upload condition setting section 713 determines whether an event has occurred or not.

If it is determined that an event has not occurred (No in S1101), the up load condition setting section 713 advances the processing to S1102.

In S1102, the upload condition setting section 713 determines whether related software that can be added exists or not. That is, the "Softw are list" 508 on the upload condition setting screen (related software) illustrated in FIG. 5 is searched. If the related software has been set in the "Software list" 508, it is determined that the related software that can be added exists.

If it is determined that no related software that can be added exists (No) in S1102, the upload condition setting section 713 advances the processing to S1104.

In S1104, the upload condition setting section 713 disables the "OK" button 509 on the setting screen illustrated in FIG. 5, and returns the processing to S1101. Note that disablement displays the text in the button in gray and sets an event of pressing the button to be incapable of being notified, using the function included in the OS.

In contrast, if it is determined that related software that can be added exists (Yes) in S1102, the upload condition setting section 713 advances the processing to S1103.

In S1103, the upload condition setting section 713 enables the "OK" button 509 on the setting screen illustrated in FIG. 5, and returns the processing to S1101. Note that enablement displays the text in the button in black and sets an event of pressing the button to be capable of being notified, using the function included in the OS.

If it is determined that an event has occurred (Yes) in S1101, the upload condition setting section 713 advances the processing to S1105.

In S1105, the upload condition setting section 713 is determined whether the event is a press of the "Add" button 504 or not. In this embodiment, if the event includes the ID indicating the "Add" button 504 on the setting screen illustrated in FIG. 5 and a left mouse button operation, it is determined that the event is a press of the "Add" button 504. Although not illustrated in FIG. 11, the "Add" button 504 is enabled after the designation of the external installer in the "file path" text area 502 in FIG. 5 is completed.

If it is determined that the event is a press of the "Add" button 504 (Yes) in S1105, the upload condition setting section 713 advances the processing to S1106.

In S1106, first, the upload condition setting section 713 acquires the path information of the "setup.exe" of the related software set in the setting value in the "file path" text area 502 in FIG. 5. Next, the upload condition setting section 713 acquires the setting information of the option of the related software set in the "Option" text box 503, stores the acquired information in the prescribed working area in the storage device, such as the RAM 202, together with the path information of the "setup.exe" of the acquired related software, and adds the information to the software list on the extended setting screen. After completion of the installer designation process in S1106, the upload condition setting section 713 returns the processing to S1101.

If it is determined that the event is not a press of the "Add" button 504 (No) in S1105, the upload condition setting section 713 advances the processing to S1107.

In S1107, the upload condition setting section 713 determines whether the event is a press of one of the "Up" button 505 and the "Down" button 506 or not. In this embodiment, if the event includes the ID indicating one of the "Up" button 505 and the "Down" button 506 on the setting screen illustrated in FIG. 5 and a left mouse button operation, it is determined that the event is a press of one of the "Up" button 505 and the "Down" button 506.

If it is determined that the event is a press of one of the "Up" button 505 and the "Down" button 506 (Yes) in S1107, the upload condition setting section 713 advances the processing to S1108. In S1108, the upload condition setting section 713 corrects the activation order information of the installer stored in the prescribed working area in the storage area, such as the RAM 202, and the display of the "Software list" 508. In detail, if the event is a press of the "Up" button 505, the upload condition setting section 713 changes the activation order of the software selected in the "Software list" 508 to go upward by one. If the event is a press of the "Down" button 506, the upload condition setting section 713 changes the activation order of the software selected in the "Software list" 508 to go downward by one. After completion of the process of changing the installer activation order in S1108, the upload condition setting section 713 returns the processing to S1101.

If it is determined that the event is neither a press of the "Up" button 505 nor a press of "Down" button 506 (No) in S1107, the upload condition setting section 713 advances the processing to S1109.

In S1109, the upload condition setting section 713 determines whether the event is a press of the "Delete" button 507 or not. In this embodiment, if the event includes the ID indicating the "Delete" button 507 on the setting screen illustrated in FIG. 5 and a left mouse button operation, it is determined that the event is a press of the "Delete" button 507.

If it is determined that the event is a press of the "Delete" button 507 (Yes) in S1109, the upload condition setting section 713 advances the processing to S1110.

In S1110, the upload condition setting section 713 deletes the related information (the information of the path of the installer, option setting information, and activation order information) of the software that is selected in the "Software list" 508 and stored in the prescribed working area in the storage device, such as the RAM 202, and corrects the display of the "Software list" 508. After the completion of the process of deleting the installer information in S1110, the upload condition setting section 713 returns the processing to S1101.

If it is determined that the event is not a press of the "Delete" button 507 (No) in S1109, the upload condition setting section 713 advances the processing to S1111.

In S1111, the upload condition setting section 713 determines whether the event is a press of the "OK" button 509 or not. In this embodiment, if the event is the ID indicating the "OK" button 509 on the setting screen illustrated in FIG. 5 and a left mouse button operation, it is determined that the event is a press of the "OK" button 509.

If it is determined that the event is not a press of the "OK" button 509 (No) in S1111, the upload condition setting section 713 returns the processing to S1101.

In contrast, it is determined that the event is a press of the "OK" button 509 (Yes), the upload condition setting section 713 finishes the process of this flowchart.

Next, the upload process in S806 in FIG. 8 will be described using FIG. 12.

Figure 12:
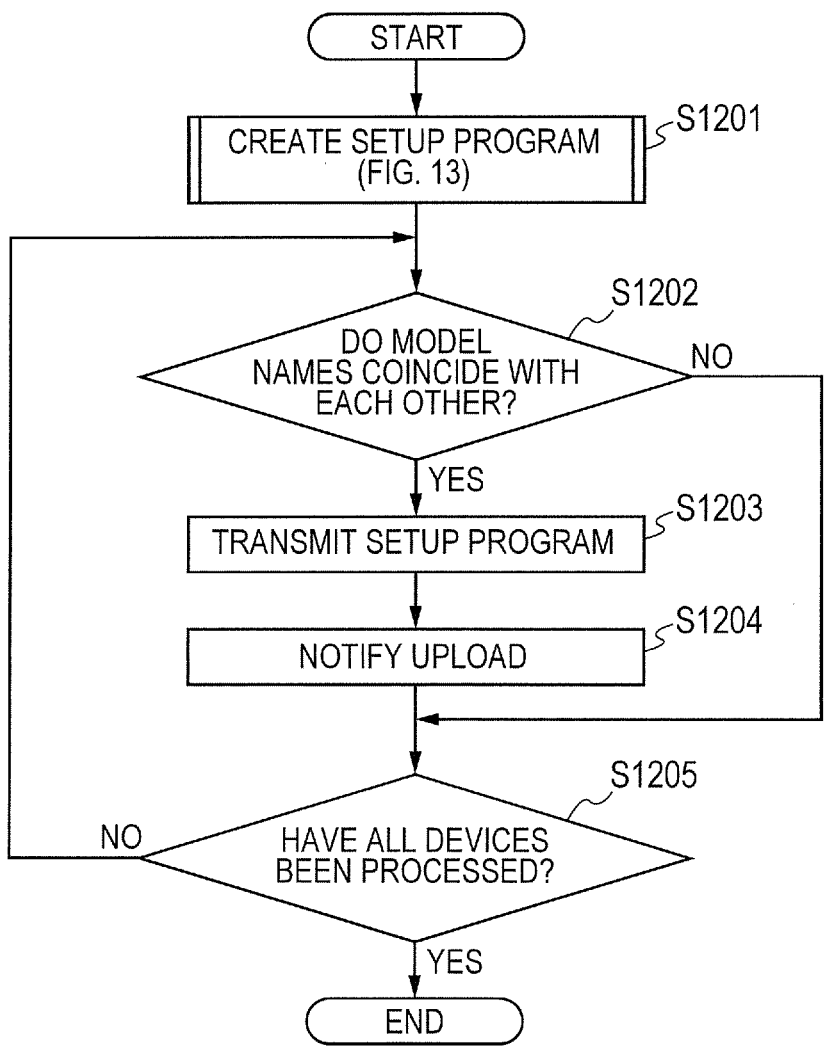
FIG. 12 is a flowchart illustrating an example of an upload process of the present invention.

FIG. 12 is a flowchart illustrating an example of the upload process in S806 in FIG. 8. The process is executed by the uploader 710. It is provided that the list of the device, which is an upload target (created in S803 in FIG. 8), and information and data required to upload and create the setup program are passed from the selector 711 to the uploader 710, and held in the working area secured in the storage region, such as the RAM 202.

In S1201, the uploader 710 calls the creation section 712, and passes the required information and the installer to be added to the setup program. The creation section 712 executes an after-mentioned setup program creation process illustrated in FIG. 13.

Next, in S1202, the uploader 710 determines whether the model names coincide with each other or not. In detail, the uploader 710 picks out one record from the device list held in the working area secured in the storage region, such as the RAM 202. Next, the uploader 710 compares the model name of the device (current device) in the picked out record with the model name of the driver of the setup program created by the creation section 712 in S1201. If the result of the comparison is coincidence, it is determined that the model names coincide with each other. In contrast, the result of the comparison is not coincidence, it is determined that the model names do not coincide with each other. For instance, in the case where the model name of the device is "C_iR-ADV C5051", if a device model name is included as with the model name of the driver "C_iR-ADV C5051/5041", it is determined that the driver model names coincide with each other.

If it is determined that the model names coincide with each other (Yes) in S1202, the uploader 710 advances the processing to S1203.

In S1203, the uploader 710 transmits the setup program. In detail, the uploader 710 arranges the setup program created by the creation section 712 in the memory 701 of the current device according to the setting value in the upload condition setting screen (FIG. 4).

Next, in S1204, the uploader 710 notifies the current device of uploading. In detail, the uploader 710 notifies the current device of the upload number, the path, the file name, and information required to create the download page held in the current device, based on prescribed procedures, using a preliminarily prepared communication unit. The uploader 710 advances the processing to S1205.

If it is determined that the model names do not coincide with each other (No) in S1202, the uploader 710 advances the processing as it is to S1205.

In S1205, the uploader 710 determines whether the processes on all the devices have completed or not. In detail, the uploader 710 searches the list of the devices stored in the working area secured in the storage region, such as the RAM 202. If no unprocessed record exists, it is determined that the processes on all the devices have been completed. In contrast, if an unprocessed record exists, it is determined that an unprocessed device exists.

If it is determined that a device on which processes have not been completed yet exists (No) in S1205, the uploader 710 returns the processing to S1202 and then executes analogous processing on the other device.

In contrast, if it is determined that the processes on all the devices have been completed (Yes) in S1205, the uploader 710 finishes the upload process.

Next, a process of creating the setup program illustrated in S1201 in FIG. 12 will be described using FIGS. 13 and 14 to 16.

Figure 13:
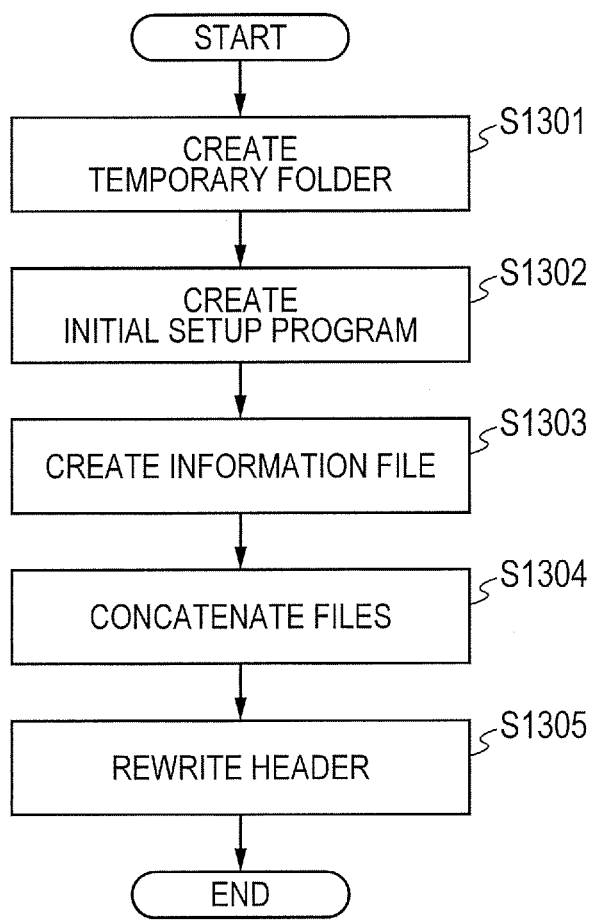
FIG. 13 is a flowchart illustrating an example of a setup program creation process of the present invention.

FIG. 13 is a flowchart illustrating an example of the setup program creation process illustrated in S1201 in FIG. 12. The process is executed by the creation section 712. It is provided that information required to create the setup program and the installer have appropriately been passed from the uploader 710.

In S1301, the creation section 712 creates a temporary folder. For instance, a folder is created in the working area secured in the storage region, such as the RAM 202 and the HD 205 of the management apparatus 101 using a function provided by the OS.

Next, in S1302, the creation section 712 creates an initial setup program illustrated in FIG. 14A in the temporary folder created in S1301.

FIGS. 14A and 14B are a diagram illustrating an example of the setup program of this embodiment.

As illustrated in FIG. 14A, the initial setup program includes a header 1401 and a program body 1402, and preliminarily stored in the HD 205 in the management apparatus 101.

The header 1401 is stored with various parameters for determining the operation of the program body. As an example, the header includes the following.

Offset_to_entry: the offset from the beginning of an area including a region stored with information of a concatenated file.

Size_of_all_entry: the total size of the regions stored with the information of the concatenated file.

size_of_file_entry: the size of the region stored with the information of the concatenated file.

num_of_entry: the total number of regions stored with the information of the concatenated file.

The initial setup program includes no concatenated file. Accordingly, the parameter is set to "0".

The program body 1402 is stored with a program for referring to the header 1401, identifying the position of the concatenated file, separating the concatenated installers, and activating the installers.

The description will hereinafter be returned to the flowchart in FIG. 13.

After completion of the initial setup program creation process in S1302, the creation section 712 advances the processing to S1303.

In S1303, the creation section 712 creates information files illustrated in FIGS. 15A, 16A and 16B in the temporary folder created in S1301, using the upload condition.

FIGS. 15A and 15B are a diagram illustrating an example of the file that describes information required on activation of the setup program and information required to create an aftermentioned download page. It is provided that the file name is "setup.ini".

As illustrated in FIG. 15A, the "setup.ini" file includes a [DriverUploadInfo] section. The following setting is allowed. What has no entry is dealt with as those with no setting value.

DriverModelName: the driver model name

PrinterName: the name of a logical printer installed in the PC

Comments: comments set in the logical printer installed in the PC

PortType: the port type (1: IP address, 2: host name, 3: port name)

PortName: the port name (enabled only in the case of PortType=3)

In the example in FIG. 15A, the driver model is "C_iR-ADV C5045/5051", the logical printer name is "C_iR-ADV C5051", the comment is "3F share printer", and the port type is "1", which means an IP address.

FIGS. 16A to 16C are a diagram illustrating an example describing information required for the installer separated from the concatenated setup program. The file name is "silent.ini".

As illustrated in FIGS. 16A and 16B, the "silent.ini" file includes sections of [InstallType], [InstallComplete], [SelectJob], [PrinterInfo], [SoftwareInfo] and [SoftwareOption]. The following setting is allowed.

Type: a flag for determining whether an installer to be installed is a printer driver or a related software (0: printer driver, 1: related software).

Reboot: a flag for controlling PC rebooting after completion of installation (0: without reboot, 1: reboot).

SelectJob: the installation mode of a printer driver (0: new installation, 1: overwriting installation, 2: without installation).

PRT1: designation of a logical printer name/driver model/connection port.

SoftInfo: information on software (e.g., software name).

SoftOption: option key/option setting value.

The example in FIG. 16A is the "silent.ini" file for the installer for a printer driver, and designates no reboot and overwriting installation. The logical printer name, the driver model, and the connection port have not been set in the initial state. These items having not been set are set in an aftermentioned setup program updating process.

Meanwhile, the example in FIG. 16B is the "silent.ini" for the installer for related software, and designates no reboot and overwriting installation. The related software name to be added is "Software". The option key to be set is "Server". The option value to be set is "172.1.1.1".

The description is returned to that on the flowchart of FIG. 13.

Next, in S1304, as illustrated in FIG. 14B, the creation section 712 concatenates the initial setup program created in S1302 with the information file created in S1303 and the installer acquired in S910 in FIG. 9, in the order described in the activation order information in the software acquired in S908 in FIG. 9. In each installer file, files are concatenated in an order of "setup.ini" (only in the case of a printer driver), "setup.exe" and "silent.ini". The files are concatenated for every installer.

In the example illustrated in FIG. 14B, sets of files in each installer are concatenated in an order of the printer driver (1403 to 1405) and the related software (1406 and 1407). The sets of the installer files for the printer driver are concatenated in an order of the "setup.ini" 1403, the "setup.exe" 1404 and the "silent.ini" 1405. The sets of the installer files of the related software are concatenated in an order of the setup.exe" 1406 and the "silent.ini" 1407. A configuration may be adopted where, the region stored with information of the concatenated file existing in the header in FIG. 14B (five regions in the example in FIG. 14B) includes information identifying the files configuring the same installer set, and, on separation, the files configuring the same installer set are separated according to the information. The information identifying the files configuring the same installer set may be adopted as information indicating an activation order, and the files may be separated according to the order to be activated.

Next, in S1305, the creation section 712 rewrites the header 1401 of the setup program concatenated in S1304 to create the setup program illustrated in FIG. 14B.

For simplicity, this embodiment adopts the configuration including the printer driver and one piece of related software. As illustrated in FIG. 14B, the creation section 712 sets the offset "4096" of regions 1408 stored with information of each concatenated file from the beginning of the setup program, in the "Offset_to_entry" of the header 1401. The creation section 712 further sets the total size "2560" of the regions stored with information of the concatenate file, in the "Size_of_all_entry" of the header. The creation section 712 then sets the size "512" of the region stored with the information of the concatenated file, in the "size_of_file_entry" of the header. The creation section 712 further sets the total number "5" of the regions stored with the information of the concatenated file, in the "num_of_entry" of the header.

The creation section 712 secures five regions 1408a to 1408e for storing the information of the concatenated file, in regions designated by the "Offset_to_entry". The creation section 712 then stores information of the concatenated file in the secured five regions 1408a to 1408e.

In detail, the creation section 712 sets the information of the "setup.ini" file 1603 created in S1303, the installer "setup.exe" 1604 acquired by the driver acquisition section 716 and passed from the uploader 715, and the "silent.ini" file 1605 created in S1503, in the respective regions 1606a to 1606c, from the top region. The details will be described below.

In detail, the creation section 712 sets the "setup.ini" file 1403 (FIG. 15A) for the printer driver created in S1303, the information of the installer "setup.exe" 1404 for the printer driver acquired by the printer driver acquisition section 714 and passed from uploader 710, the "silent.ini" file 1405 (FIG. 16A) that is for the printer driver and has been created in S1303, the installer "setup.exe" 1406 for the related software acquired by the related software acquisition section 715 and passed from the uploader 710, and the "silent.ini" file 1405 (FIG. 16B) that is for the related software and has been created in S1303, in the respective regions 1408a to 1408e, from the top region. The details will be described below.

OFFSET: the offset of the position of the concatenated file from the top of the setup program.

Size: the size of the concatenated file.

Type: the type of the concatenated file (1: execution file, 2: temporary file, 3: information file, 4: other).

FILENAME: the name of the concatenated file.

After completion of rewriting (S1305) the header of the setup program, the creation section 712 finishes the process of creating the setup program. Thus, the control is returned to the uploader 710.

Next, the process in the printer 105 will be described.

Figure 18:
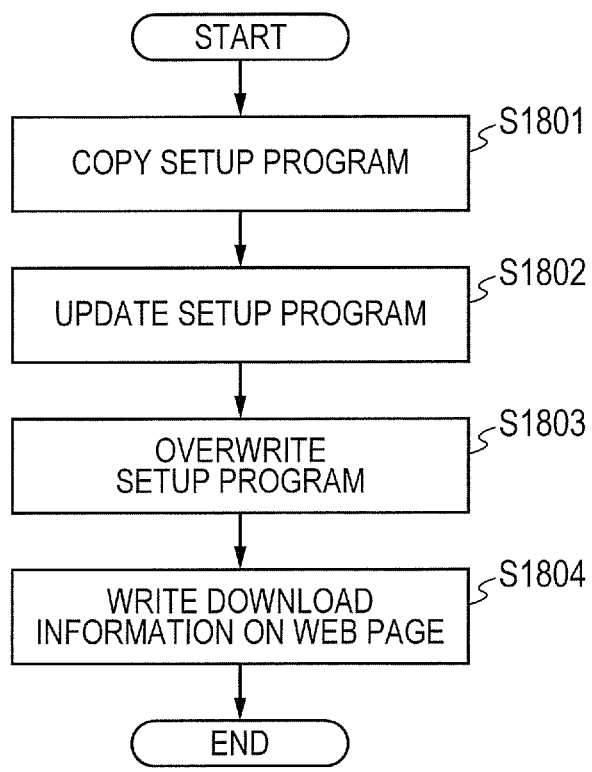
FIG. 18 is a flowchart illustrating an example of a setup program updating process executed by a setup program updater of the printer of the present invention.
Figure 19:
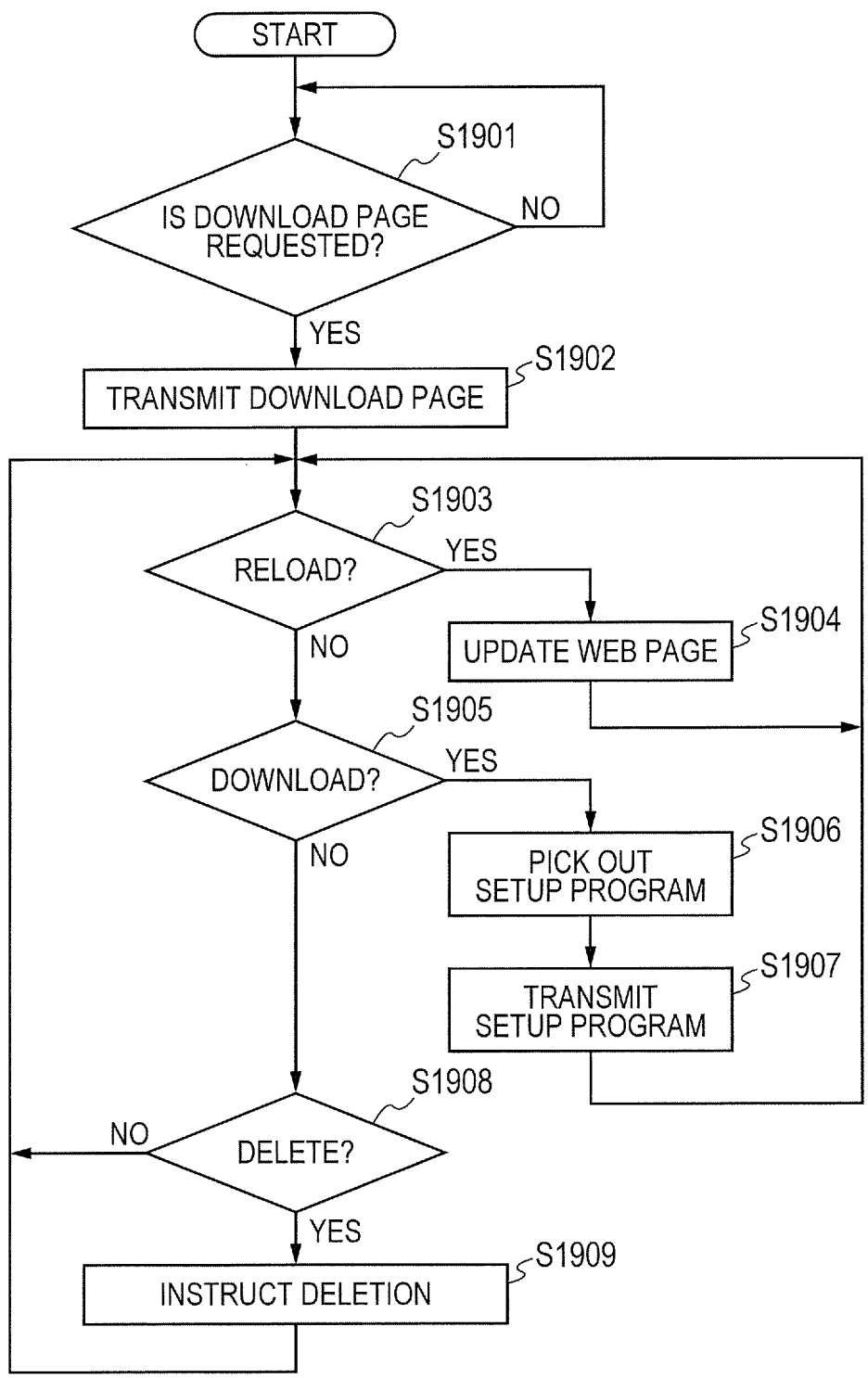
FIG. 19 is a flowchart illustrating an example of processes executed by a web server function section of the printer of the present invention.

The process executed by the monitoring section 703 of the printer 105 will hereinafter be described using FIG. 17. The monitoring section 703 is activated at the same time of the activation of the printer 105, and operates until the operation of the printer 105 is finished. The program for executing the processes illustrated in FIGS. 17, 18 and 19 is preliminarily recorded in the PROM 221 of the printer 105 in a computer-readable manner, and read and executed by the PCPU 220.

Figure 17:
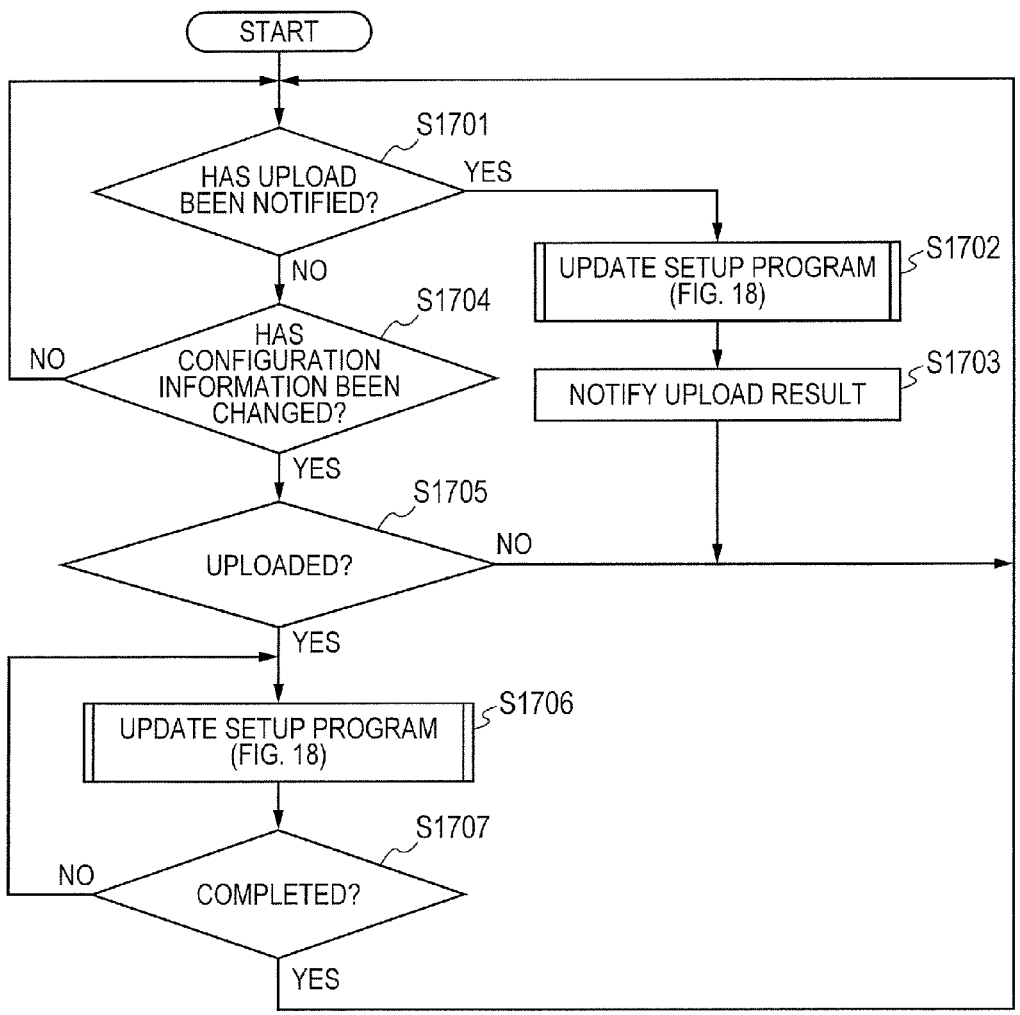
FIG. 17 is a flowchart illustrating an example of processes executed by a monitoring section of a printer of the present invention.

FIG. 17 is a flowchart illustrating an example of the processes executed by the monitoring section 703 of the printer 105.

First, in S1701, the monitoring section 703 determines whether upload of the setup program is notified from the management apparatus 101 or not. In detail, the monitoring section 703 searches packets received via the bidirectional interface 211 through the connecting section 226 based on prescribed procedures, and, when finding an upload notification with a prescribed format, determines that upload is notified.

If it is determined that upload has been notified (Yes) in S1701, the monitoring section 703 advances the processing to S1702.

In S1702, the monitoring section 703 calls the setup program updater 704. At the same time, the monitoring section 703 passes after-mentioned configuration information, and registration instruction to the setup program updater 704, in addition to the upload number acquired by the upload notification, the path, the file name, and information required to create a download page. Thus, the setup program updater 704 executes an after-mentioned setup program updating process illustrated in FIG. 18.

After completion of the setup program updating process (S1702), the monitoring section 703 advances the processing to S1703.

In S1703, the monitoring section 703 notifies an upload result. In detail, the monitoring section 703 transmits an upload result notification created in a prescribed format to the originator (management apparatus 101) of the upload notification detected in S1701, via the connecting section 226. After completion of the process of notifying the upload result, the monitoring section 703 returns the processing to S1701.

In contrast, if it is determined that upload has not been notified in S1701, the monitoring section 703 advances the processing to S1704.

In S1704, the monitoring section 703 determines whether the configuration information has been changed or not. In detail, the monitoring section 703 sequentially reads the configuration information held in a prescribed region in the storage device, such as the PRAM 222, and, in the case of any change from the time of the previous determination, determines that the configuration information has been changed.

If it is determined that the configuration information has not been changed (No) in S1704, the monitoring section 703 returns the processing to S1701.

In contrast, if it is determined that the configuration information has been changed (Yes) in S1704, the monitoring section 703 advances the processing to S1705. At this time, the monitoring section 703 stores the configuration information, as a comparison target at the next determination, in a working area preliminarily prepared in the storage device, such as PRAM 222. Examples of the configuration information are the IP address and the device name that can be changed by the administrator.

In S1705, the monitoring section 703 determines whether the setup program has been uploaded or not. In detail, if the setup program has been uploaded from the management apparatus 101, the monitoring section 703 reads management information from a region preliminarily prepared in the storage device, such as the HD 228, in which the uploading is written as the management information. As a result of reading, if at least one piece of information on the setup program exists, the monitoring section 703 determines that the setup program has been uploaded from the management apparatus 101.

If it is determined that no uploaded setup program exists (upload has not been completed) (No) in S1705, the monitoring section 703 returns the processing to S1701.

In contrast, it is determined that an updated setup program exists (upload has been completed) (Yes) in S1705, the monitoring section 703 advances the processing to S1706.

In S1706, the monitoring section 703 calls the setup program updater 704. At the same time, the monitoring section 703 reads one piece of information of the setup program having not been updated, from the management information on the setup program, and passes the update instruction and the configuration information acquired in S1704, in addition to the read upload number, the path, the file name, and information required to create a download page, to the setup program updater 704. Thus, the setup program updater 704 executes an after-mentioned setup program updating process illustrated in FIG. 19.

After completion of the setup program updating process (S1706), the monitoring section 703 advances the processing to S1707.

In S1707, the monitoring section 703 determines whether the processes of updating all the setup programs uploaded from the management apparatus 101 have been completed or not. In detail, the monitoring section 703 searches the management information on the setup program. If no setup program having not been updated exists, this section determines that the processes of updating all the setup programs have been completed.

If it is determined that any process of updating a setup program has not been completed (No) in S1707, the monitoring section 703 returns the processing to S1706 and executes the next process of updating the setup program.

In contrast, if it is determined that the processes of updating all the setup programs have been completed (Yes) in S1707, the monitoring section 703 returns the processing to S1701.

Next, the setup program updating process by the setup program updater 704 of the printer 105 will be described using FIG. 18.

FIG. 18 is a flowchart illustrating an example of the setup program updating process executed by the setup program updater 704 of the printer 105.

It is provided that the update instruction from the monitoring section 703, the upload number, the path, the file name, and information required to create a download page are stored in the working area secured in the PRAM 222 of the printer 105. In this process, the processing according to the information stored in the working area will be described.

In S1801, the setup program updater 704 copies the setup program concerned that is arranged in the storage device, such as the HD 228 of the printer 105, to the working area secured in the storage device, such as the PRAM 222.

Next, in S1802, the setup program updater 704 reflects the configuration information passed from the monitoring section 703 in the setup program copied in S1801 (updating the setup program). For instance, a case is considered where information of the IP address is "172.10.10.10", the device name is "Color_Printer", the device model name is "C_iR-ADV C5051", and the driver model name is "C_iR-ADV C5045/5051" are reflected. In this case, the "setup.ini" file (e.g., FIG. 15A) concatenated with the setup program copied in S1801, and the "silent.ini" file (e.g., FIG. 16A) for the printer driver are updated and stored. FIGS. 15B and 16C illustrate updated files. It is illustrated that the device name is reflected in the logical printer name, the IP address is reflected in the port name, and the device model name is reflected in the device model name; the data are thus changed.

Next, in S1803, the setup program updater 704 overwrites the setup program updated in S1802 on the original file of coping in S1801.

Next, in S1804, the setup program updater 704 writes download information in which the configuration information passed from the monitoring section 703 is reflected, into the web page (the web page disclosed by the web server function section 705) stored in the storage device, such as the HD 228. Thus, the contents of the web page (FIG. 6) transmitted from the web server function section 705 to the web browsers 620 of the clients 103 and 104 are updated.

Subsequently, the setup program updater 704 releases the working area, and finishes the setup program updating process. At this time, the setup program updater 704 passes information for notifying a result of this process, such as update completion, to the monitoring section 703.

Here, the setup program deleting process (not illustrated) executed by the setup program updater 704 of the printer 105 will be described.

First, the setup program updater 704 deletes the setup program concerned that is arranged in the storage device, such as the HD 228.

Next, the setup program updater 704 writes download information in which information on the setup program concerned has been deleted, into the web page (the web page disclosed by the web server function section 705) stored in the storage device, such as the HD 228. Subsequently, the setup program updater 704 releases the working area, and finishes the setup program updating process. At this time, the setup program updater 704 passes the information, such as delete completion, for notifying a result of this process to the monitoring section 703.

Hereinafter, referring to FIG. 19, the process by the web server function section 705 of the printer 105 will be described.

FIG. 19 is a flowchart illustrating an example of the process by the web server function section 705 of the printer 105. The web server function section 705 is activated at the same time of activation of the printer 105, and operates until the operation of the printer 105 is finished.

First, in S1901, the web server function section 705 waits for a download page display request by the client 102 via the network, and repeats the processing in S1901 until the download page display request is issued.

After the download request is received in S1901, the web server function section 705 advances the processing to S1902.

In S1902, the web server function section 705 transmits the download page (e.g., the screen illustrated in FIG. 6) to the requestor, based on a prescribed method.

Next, in S1903, the web server function section 705 determines whether the user has instructed reloading or not. In detail, the web server function section 705 searches the packets received via the connecting section 226, and determines whether any reloading request by the web browser exists or not. If a reloading request is found, it is determined that reloading instruction has been issued.

It is determined that reloading instruction has been issued (Yes) in S1903, the web server function section 705 advances the processing to S1904.

In S1904, the web server function section 705 reconstructs the web page, transmits a reconstructed page to the web browser 720 as the requester (updating the web page), and returns the processing to S1903.

In contrast, if it is determined that reloading instruction has not been issued (No) in S1903, the web server function section advances the processing to S1905.

In S1905, the web server function section 705 determines whether the user has instructed downloading or not. In detail, the web server function section 705 searches packets received via the connecting section 226, and determines whether any downloading request exists or not. If a downloading request is found, it is determined that downloading instruction has been issued.

If it is determined that downloading instruction has been issued (Yes) in S1905, the web server function section 705 advances the processing to S1906.

In S1906, the web server function section 705 picks out the setup program designated by the downloading request, from the storage device, such as the HD 228.

Next, in S1907, the web server function section 705 transits the setup program picked out in S1905 to the requester having instructed downloading. For instance, the transmission is made to the web browser 620 of the client 102. After the transmission, the web server function section 705 returns the processing to S1903.

If it is determined that a downloading instruction has not been issued (No) in S1905, the web server function section 705 advances the processing to S1908.

In S1908, the web server function section 705 determines whether the user has instructed deletion or not. In detail, the web server function section 705 searches the packets received via the connecting section 226, and determines whether any deleting request exists or not. If a deleting request is found, it is deter mined that the deletion has been instructed.

If it is determined that the deletion has been instructed (Yes) in S1908, the web server function section 705 advances the processing to S1909.

In S1909, the web server function section 705 issues, to the monitoring section 703, a delete instruction for deleting the setup program as instructed, based on prescribed procedures. According to the delete instruction, the monitoring section 703 calls the setup program updater 704, and this setup program updater 704 deletes the setup program to which the deletion has been instructed.

After the delete instruction (S1909), the web server function section 705 returns the processing to S1903.

In contrast, it is determined that the deletion has not been instructed (No) in S1908, the web server function section 705 returns the processing to S1903.

Hereinafter, referring to FIG. 20, the process that is executed by the setup module and realized by executing the setup program 702 will be described.

Figure 20:
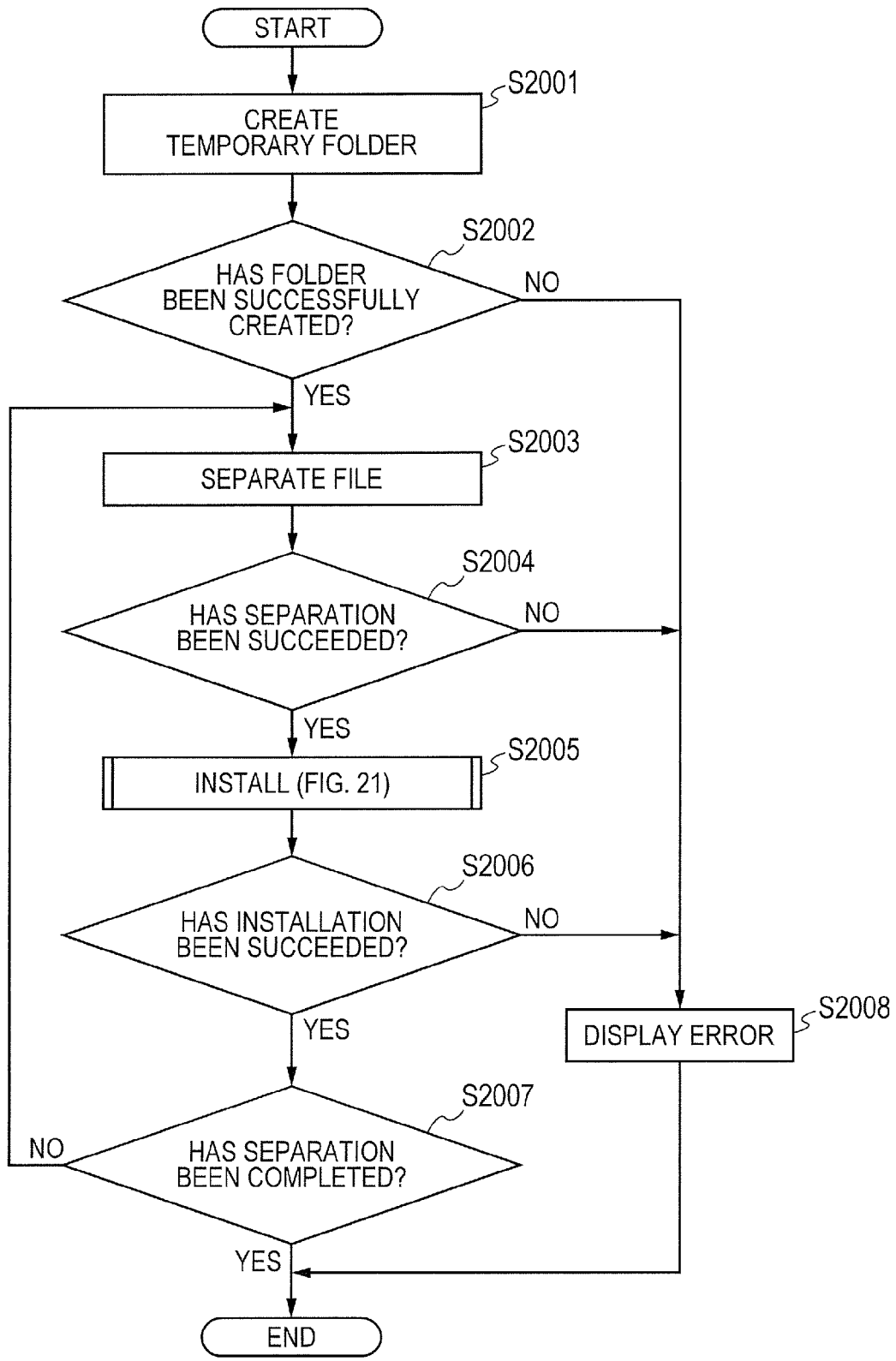
FIG. 20 is a flowchart illustrating an example of processes that are executed by a setup module and realized through execution of the setup program of the present invention.

FIG. 20 is a flowchart illustrating an example of the process that is executed by the setup module and realized by executing the setup program 702.

The setup program 702 is downloaded to the client 102 by the user and an executing instruction is issued, thereby allowing the CPU 200 of the information processing apparatus (here, description is made using the client 102) to execute this program. After the setup program 702 (in particular, the program body 1402) is activated, the program is loaded in the program region secured in the storage device, such as the RAM 202 of the client 102, and executed by the CPU 200 of the client 102, thus realizing the setup module.

In S2001, the setup module creates a temporary folder. For instance, the module uses a function provided by the OS to create the folder in the working area secured in the storage region, such as the RAM 202 and the HD 205 of the client 102.

Next, in S2002, the setup module determines whether the folder has been successfully created or not in S2001.

If it is determined that the folder creation has failed (No) in S2002, the setup module advances the processing to S2008, displays an error on the display 207 of the client 102, and finishes the processing.

In contrast, if it is determined that the folder has been successfully created (Yes) in S2002, the setup module advances the processing to S2003.

In S2003, the setup module separates the concatenated file, and creates the separated file in the temporary folder created in S2001. In detail, the setup module is separated, starting from that with a small OFFSET. If the beginning of the unprocessed part is "setup.ini", three files which are "setup.ini", "setup.exe" and "silent.ini" are separated. Meanwhile, the beginning of the unprocessed part is "setup.exe", two files which are "setup.exe" and "silent.ini" are separated. The separated files are created in the temporary folder created in S2001. According to such a separating method, the installer is separated in an order (an order pursuant to the activation order information) set in the "Software list" 508 in FIG. 5. Information identifying the files configuring the same installer set may be described in the regions (five regions in the example in FIG. 14B) existing in the header in FIG. 14B for storing the information of the concatenated file. According to this information, the files configuring the same installer set may be separated. The information identifying the files configuring the same installer set may be adopted as information indicating an activation order, and the files may be separated and activated in the order.

Next, in S2004, the setup module determines whether the file separation process in S2003 has been succeeded or not.

If it is determined that the file separation process has failed because, for instance, the temporary folder is write-protected (No) in S2004, the setup module advances the processing to S2008, displays an error on the display 207 of the client 102, and finishes the processing.

In contrast, if it is determined that the file separation process has succeeded (Yes) in S2004, the setup module advances the processing to S2005.

Figure 21:
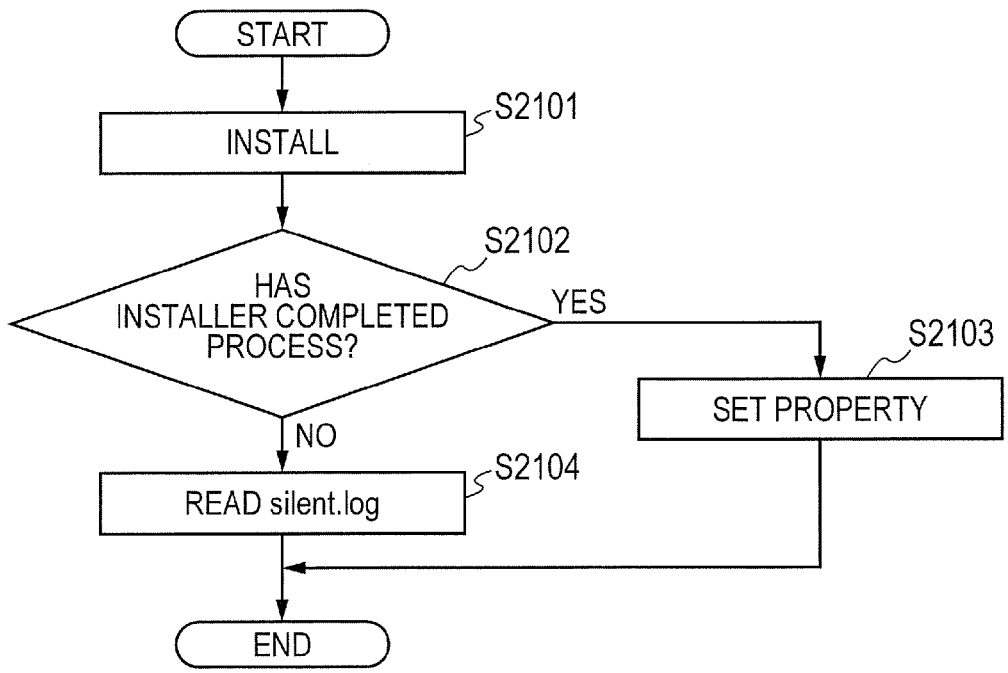
FIG. 21 is a flowchart illustrating an example of details of a driver installation process executed by the setup module of the present invention.

In S2005, the setup module executes an after-mentioned driver installation process illustrated in FIG. 21, and advances the processing to S2006.

In S2006, the setup module determines whether the installation process executed in S2005 has succeeded or not.

If it is determined that the installation has failed (No) in S2006, the setup module advances the processing to S2008. In S2008, the setup module appropriately creates an error message based on the error details captured from the "silent.log" and error information that can be acquired from the OS, displays an error message on the display 207 of the client 102, and finishes the processing.

In contrast, if it is determined that the installation has succeeded (Yes) in S2006, the setup module advances the processing to S2007.

In S2007, the setup module determines whether the separation processes on all the files have been completed or not.

If it is determined that any file to be separated exists (No) in S2007, the setup module returns the processing to S2003.

In contrast, if it is determined that the separation processes on all the files have been completed (Yes) in S2007, the setup module finishes the processes of this flowchart.

Next, referring to FIG. 21, the installation process in S2005 in FIG. 20 will be described.

FIG. 21 is a flowchart illustrating in detail the driver installation process executed by the setup module in S2005 in FIG. 20.

First, in S2101, the setup module executes the installer separated in S2003 in FIG. 20 to perform the installation process of one of the printer driver and the related software.

Next, in S2102, the setup module determines whether or not the process of the installer for one of the printer driver and the related software; the installer has been activated in S2101. For instance, if the return value of the installer for one of the printer driver and the related software is "0", it is determined that the process has been completed; if the value is other than "0", it is determined that the process has finished with an error.

If it is determined that the process of the installer has been completed (Yes) in S2102, the setup module advances the processing to S2103.

In S2103, the setup module sets the property. If the installer is for the printer driver, the setup module sets the property of the logical printer. For instance, the Win32 function SetPrinter( ) prepared in Windows (registered trademark) made by Microsoft Corporation is used. "Comments" described in the "setup.ini" file separated in S2003 in FIG. 20 is set in the member "PComment" of the PRINTER_INFO_2 structure of this function. Meanwhile, if the installer is for the related software, an option of the installer described in the "silent.ini" file is set.

After completion of the property setting (S2103), the setup module finishes the processes of this flowchart.

In contrast, if it is determined that the process of the installer has not been completed (No) in S2102, the setup module advances the processing to S2104.

In S2104, the setup module picks out error details from the "silent.log" created by the installer, and finishes the processes in this flowchart. Subsequently, an error is displayed in S2006 in FIG. 20, based on the error details picked out from the "silent.log".

As described above, according to Embodiment 1, the printer driver for the printer and the related software can be installed in the information processing apparatus in an appropriate order, and the setup program that allows appropriate setting processes to be performed on the installed related software can be easily registered in the printer.

Embodiment 2

A second embodiment of the present invention will hereinafter be described.

It is considered that software is installed in the printer, or the external device in which the soft ware is installed is connected to thereby improve the printing function.

For instance, the software installed in the client adds authentication information to the print job, and transmits the job to the printer. The printer transmits the authentication information added to the print job, to an authentication server provided on a network, and performs printing only of an authenticated job. In the printing system, dedicated application software is required to be installed in both of the client and the printer. To operate the printing system, strict matching that includes correspondence in version is required between the software installed in the printer and the software to be installed in the client cooperating with the software.

In Embodiment 2, in the case where correspondence between the software registered in the printer and the software for the client to be installed in the client cooperating with the software is secured, a configuration is adopted where the software for the client is added to the setup program.

Embodiment 2 will hereinafter be described using FIGS. 22 and 25.

In this embodiment, information including the name and the version of the software installed in the printer is called software information. The software information is held in the management application executed in the management apparatus 101 according to setting of the administrator, and appropriately passed from the management application to the upload condition setting section 713 when the upload condition setting section 713 is called.

Referring to FIG. 25, an example of the software information held in the management application will hereinafter be described.

FIG. 25 is a diagram illustrating an example of the software information held in the management application in Embodiment 2. The software information is provided for each printer, and stored in the HD 205 of the management apparatus 101. The management application reads the software information corresponding to the device designated on the device selection screen in FIG. 3, from the HD 205 to the RAM 202 and holds the information.

For instance, as illustrated in FIG. 25, the software information holds information of Software 2501, Software Version 2502, is Installed 2503, and Supported Application 2504.

The Software 2501 is the name of the software installed in the printer. The Software Version 2502 is the version information of the Software 2501 installed in the printer. The is Installed 2503 is a flag representing whether the Software 2501 is installed in the printer or not. A value of the is Installed 2503 of "1" indicates that the Software 2501 is installed in the printer. Meanwhile, a value of the is Installed 2503 of "0" indicates that the Software 2501 is not installed in the printer. The Supported Application 2504 is information on the software cooperating with the Software 2501. That is, the software described in the Supported Application 2504 is installed in the client. The information on the software described in the Supported Application 2504 may include version information.

That is, the software information illustrated in FIG. 25 is setting information for each printer that includes information on a cooperation program operating in cooperation with the program having already been installed in the printer.

In this embodiment, for simplicity, only points different from those of Embodiment 1 will be described.

Embodiment 2 is different from Embodiment 1 in the installer designation process in S1106 in FIG. 11.

Figure 22:
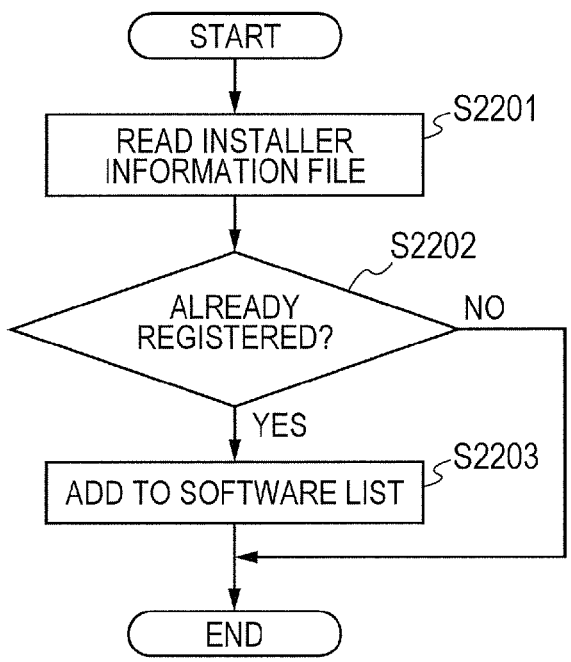
FIG. 22 is a flowchart illustrating an example of an installer designation process in Embodiment 2 of the present invention.

Referring to FIG. 22, the installer designation process in Embodiment 2 will hereinafter be described.

FIG. 22 is a flowchart illustrating an example of an installer designation process in Embodiment 2. The program for realizing the processes illustrated in FIG. 22 is pre-installed in the HD 205 of the management apparatus 101, called into the RAM 202, and executed by the CPU 200.

In Embodiment 2, if it is determined that the event is a press of the "Add" button 504 (Yes) in S1105 in FIG. 11, the upload condition setting section 713 executes, in S1106, the installer designation process illustrated in FIG. 22.

First, in S2201, the upload condition setting section 713 acquires detailed information, such as the name and the version of the software to be installed, from the installer on the path described in the "file path" text area 502 on the upload condition setting screen illustrated in FIG. 5. As to the information of the installer, the installation information is read from the file property. Instead, if the installer information file exists, the file may be read from the path described in the "file path" text area 502.

Next, in S2202, the upload condition setting section 713 determines whether the software cooperating with the software acquired in S2201 has already been registered or not. In detail, the upload condition setting section 713 compares the detailed information of the software acquired in S2201 with software information (FIG. 25) that has be en passed from the management application and corresponds to the printer designated on the device selection screen illustrated in FIG. 3. For instance, it is provided that the detailed information acquired in S2202 includes the software name "App1". In this case, the Supported Application 2504 of the software information is searched for. If the record corresponding to "App1" exists, the is Installed 2503 is referred to. If the value is "1", it is determined that the software cooperating with the "App1"

has already been registered in the printer. If the information on software described in the Supported Application 2504 includes the version information, coincidence is determined also in consideration of version information.

It is determined that the software has been registered (Yes) in S2202, the upload condition setting section 713 advances the processing to S2203.

In S2203, the upload condition setting section 713 adds the information on the software acquired in S2201 to the "Software list" 508 in FIG. 5, and finishes the processes of this flowchart.

In contrast, it is determined that the software has not been registered (No) in S2202, the upload condition setting section 713 finishes the processes of this flowchart without adding the information on the software acquired in S2201 to the "Software list" 508.

That is, in the case of designation of the installer program for the related software, the upload condition setting section 713 performs control of limiting (disabling) designation of what is other than the installer program for the program described as the cooperation program (Supported Application 2504) cooperating with the installed program in software information (FIG. 25).

Thus, the setup program created by the creation section 712 only includes, as the installer program for the related software, the installer program for the program described as the cooperation program in the software information in FIG. 25.

As described above, Embodiment 2 has advantageous effects in addition to those of Embodiment 1; i.e., the administrator can easily create the setup program to which only the software for the client capable of operating in cooperation with the software already registered in the printer is added, and register the created program to the printer.

This configuration negates the possibility that the administrator erroneously adds the software for the client operating in cooperation with the software having not registered in the printer to the setup program.

Accordingly, in the case where the general user downloads the setup program from the printer into the client, only the software on the side of the client corresponding to the software having already installed in the printer can be installed in the client together with the printer driver for the printer. This configuration negates the possibility that the user erroneously installs, in the client, the software for the client corresponding to the software having not been registered in the printer. As a result, the printing system allowing the client and the printer operating in appropriate cooperation with each other can be constructed.

Embodiment 3

Also in Embodiment 3, it is provided that dedicated application software is required to be installed in both of the client and the printer, as with Embodiment 2.

Embodiment 3 is different from Embodiment 2 in that it is determined whether related software can be used in the printer or not. Update of the setup program according to change of setting information in the printer allows a setup program supporting the latest printer to be automatically realized.

In this embodiment, for simplicity, only points different from those in Embodiment 1 will be described.

In Embodiment 3, the setup program updating process in S1802 in FIG. 18 is different.

Hereinafter, referring to FIG. 23, a setup program updating process in S1802 in FIG. 18 in Embodiment 3 will be described.

Figure 23:
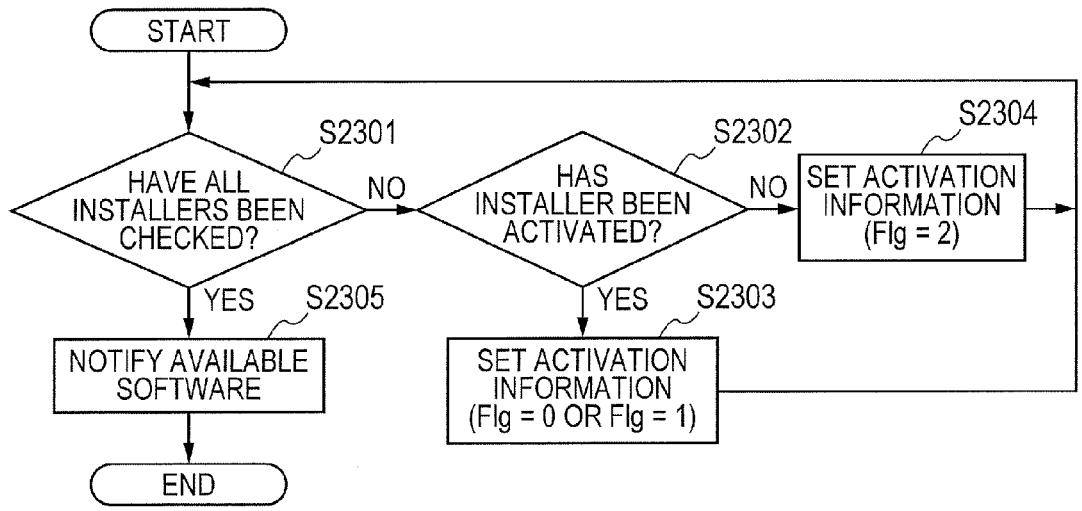
FIG. 23 is a flowchart illustrating an example of a setup program updating process executed by a setup program updater of a printer in Embodiment 3 of the present invention.

FIG. 23 is a flowchart illustrating an example of the setup program updating process (S1802 in FIG. 18) executed by the setup program updater 704 of the printer 105 in Embodiment 3. A program for realizing processes illustrated in FIG. 23 is preliminarily registered in the PROM 221 in the printer 105 in a computer-readable manner, read from the PCPU 220, and executed.

After the process (copying the setup program in the PRAM 222) in S1801 in FIG. 18, in S1802 the setup program updater 704 executes processes in the flow chart illustrated in FIG. 23. In Embodiment 3, the change of the configuration information in S1704 in FIG. 17 also includes installation of software in the printer. That is, the setup program updating process in FIG. 18 is executed also in the case where the software is installed in the printer. In this processing, the processes in this flowchart are executed.

First, in S2301, the setup program updater 704 determines whether update verification has been completed on all the installers that have been copied in S1801 and exist in the setup program (checking completed) or not.

If it is determined that an installer on which update verification has not been completed yet exists (No) in S2301, the setup program updater 704 advances the processing to S2302.

In S2302, the setup program updater 704 reflects the configuration information of the device, and determines whether each installer included in the setup program has been activated or not. In detail, the setup program updater 704 reflects the configuration information (IP address, the printer name, the device model name, and the driver model name) of the device in the information file ("Setup.ini" and "Silent.ini") held in the installer (as with S1802 in FIG. 18). The setup program updater 704 determines whether or not the software cooperating with the software (related software) installed in the client by the setup program exists (already installed) or not.

If it is determined that the software cooperating with the related software has been installed in the printer (Yes) in S2302, the setup program updater 704 advances the processing to S2303.

In S2303, the setup program updater 704 sets the value of the [SelectJob] of "Silent.ini" in FIGS. 16A to 16C as the Flg to "0" (Flg=0), and returns the processing to S2301. Instead, in S2303, the value of [SelectJob] in the "Silent.ini" may be set to "1" (Flg=1). For instance, in the case where a setup program including the installer for the same software has already been registered in the printer, the value of [SelectJob] may be set to "1" (Flg=1).

In contrast, it is determined that the software cooperating with the related software has not been installed in the printer (No) in S2302, the setup program updater 704 advances the processing to S2304.

In S2304, the setup program updater 704 sets the value of [SelectJob] of the "Silent.ini" in FIGS. 16A to 16C as Flg to "2" (Flg=2), and returns the processing to S2301.

If it is determined that all the installers in the setup program have been checked (Yes) in S2301, the setup program updater 704 advances the processing to S2305.

In S2305, the setup program updater 704 notifies available software. The notification of the available software means notifying an administrator of information on whether the installer can be installed or not to the installer in the setup program. The notification to the administrator may be performed according to any method, which is, for instance, transmission of email to the email address of the administrator preset in the external memory 223 of the printer. In the case where the related software of the installer that does not exist in the setup program has been added to the printer, notification may be performed to the administrator.

That is, the setup program updating process in the printer 105 illustrated in FIG. 23 is a process of changing such that the installer program for a program other than the cooperation program operating in cooperation with the program already installed in the printer 105 among the installer programs included in the setup program is disabled to be activated in the information processing apparatus 102.

The setup program is changed by the printer 105 when the configuration information (e.g., installation of software) of the printer 105 is changed.

Next, referring to FIG. 24, an installation process (S2005 in FIG. 20) in Embodiment 3 will be described.

Figure 24:
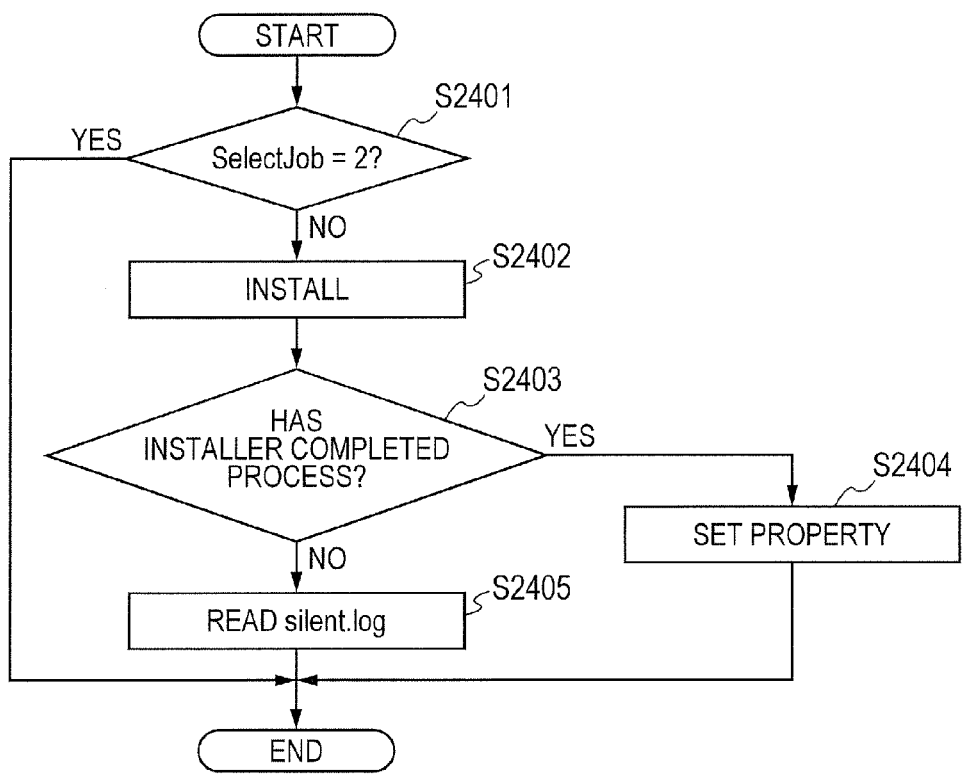
FIG. 24 is a flowchart illustrating details of a driver installation process in Embodiment 3 of the present invention.

FIG. 24 is a flowchart illustrating in detail the driver installation process (S2005 in FIG. 20) in Embodiment 3, and executed in the setup module realized by executing the setup program 702.

First, in S2401, the setup module determines whether the value of the [SelectJob] in "Silent.ini" separated in S2003 in FIG. 20 is "2" or not.

If it is determined that the value of [SelectJob] is "2" (Yes) in S2401, the setup module finishes the processes of this flowchart without installation.

In contrast, if it is determined that the value of [SelectJob] is not "2" (No) in S2401, the setup module executes the processes in S2402 to S2405. The processes in S2402 to S2405 are the same as the processes in S2101 to S2104 in FIG. 21. Accordingly, the description thereof is omitted.

That is, as illustrated in FIG. 24, the setup program changed in the updating process in FIG. 23 is set such that the installer program for the program other than the cooperation program operating in cooperation with the program already installed in the pr inter 105 among the installer programs included in the setup program is disabled to be activated in the client 102.

As described above, Embodiment 3 has advantageous effects in addition to those of Embodiment 1; i.e., even if the administrator adds the related software cooperating with the software having not been registered in the printer to the setup program, the setup program that is not installed in the client can be easily registered in the printer.

Accordingly, if the general user down loads the setup program from the printer to the client and executes the program, only the related software cooperating with the software having already been registered in the printer together with the printer driver for the printer can be installed in the client. Thus, the user is prevented from erroneously installing the software for the client supporting the software having not been registered in the printer (useless installation). As a result, the printing system allowing the client and the printer operating in appropriate cooperation with each other to operate can be constructed.

The above description has been made using the example of the IP address in the form of "Internet Protocol Ver. 4" as the destination of the print data. However, the present invention is also applicable to an IP address in another form.

The description has been made using the example of the printer as a typical device. However, the present invention is not limited to the printer. Instead, the present invention is applicable to a multi-function device having a printing function, and a fax operated by a fax driver having a function analogous to that of the printer driver. Any device driver can be adopted as long as the device driver is for a device managed by the management apparatus 101. For instance, in the case where the device managed by the management apparatus 101 includes a scanner, the driver may be a scanner driver.

As described above, the present invention allows the administrator to set an order of installing device drivers and the related software, such as printer drivers, and to designate setting information that is to be set in the related software. Accordingly, the general user can install in an appropriate order of installing the device driver and the related software in a target PC, and perform appropriate setting on the related software, thereby allowing a desired installation result to be acquired. Furthermore, an installation preparing operation and management of the installers by the administrator can be facilitated. As a result, convenience for the administrator and the general user on installation of the device driver can be improved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-086948, filed Apr. 6, 2012, which is hereby incorporated by reference herein in its entirety.

What is claimed is:

1. A management apparatus for registering a device driver in a peripheral device, comprising:
 a first designation unit configured to designate (a) a first installer program for installing the device driver for the peripheral device in an information processing apparatus, and (b) at least one second installer program for installing a program related to the device driver in the information processing apparatus;
 a second designation unit configured to designate an activation order of the first and second installer programs designated by the first designation unit; and
 a computer, which functions as:
 a creation unit configured to create a setup program that includes the designated first and second installer programs and activate the designated first and second installer programs in the activation order designated by the second designation unit, and a registration unit configured to register the setup program created by the creation unit in a storage region in the peripheral device, wherein the setup program is changed by the peripheral device such that an installer program which is included in the setup program and which is for installing a program other than a cooperation program operating in cooperation with a program installed in the peripheral device is not activated in the information processing apparatus.

2. The management apparatus according to claim 1, further comprising a storing unit configured to store setting information including information of the cooperation program operating in cooperation with a program installed in the peripheral device, wherein the setup program only includes, as the second installer program, an installer program for a program described as the cooperation program in the setting information.

3. The management apparatus according to claim 2, wherein, when designating the second installer program, the first designation unit prohibits designation of what is other than the installer program for a program described as the cooperation program in the setting information.

4. The management apparatus according to claim 1, wherein the setup program is changed by the peripheral device when configuration information of the peripheral device is changed.

5. The management apparatus according to claim 1, wherein the first designation unit also sets a setting value of the second installer program, and wherein the creation unit creates the setup program including the setting value of the second installer program designated by the first designation unit.

6. A system comprising a peripheral device and a management apparatus, wherein the management apparatus comprises:

a first designation unit configured to designate a first installer program for installing a device driver for the peripheral device in an information processing apparatus, and designate at least one second installer program for installing a program related to the device driver in the information processing apparatus;

a second designation unit configured to designate an activation order of the first installer program and the second installer program designated by the first designation unit; and a computer, which functions as:

a creation unit configured to create a setup program that includes the first installer program and the second installer program designated by the first designation unit and activate the first and second installer programs in the activation order designated by the second designation unit, and a registration unit configured to register the setup program created by the creation unit in a storage region in the peripheral device, and wherein the peripheral device comprises:

a changing unit configured to change the setup program such that an installer program which is included in the setup program and which is for installing a program other than a cooperation program operating in cooperation with a program installed in the peripheral device is not activated in the information processing apparatus; and a transmission unit configured to transmit the setup program registered in the storage region to the information processing apparatus, according to a request by the information processing apparatus.

7. The system according to claim 6, wherein the management apparatus further comprises a storing unit configured to store setting information including information of the cooperation program operating in cooperation with a program installed in the peripheral device, and wherein the setup program only includes an installer program for a program described as the cooperation program in the setting information.

8. The system according to claim 7, wherein, when designating the second installer program, the first designation unit prohibits designation of what is other than the installer program for a program described as the cooperation program in the setting information.

9. The system according to claim 6, wherein, when configuration information of the peripheral device is changed, the changing unit changes the setup program.

10. The system according to claim 6, wherein the first designation unit also sets a setting value of the second installer program, and wherein the creation unit creates the setup program including the setting value of the second installer program designated by the first designation unit.

11. A method for controlling a management apparatus for registering a device driver in a peripheral device, comprising:

designating (a) a first installer program for installing the device driver for the peripheral device in an information processing apparatus, and (b) at least one second installer program for installing a program related to the device driver in the information processing apparatus;

designating an activation order of the designated first and second installer programs;

creating a setup program that includes the designated first and second installer programs;

activating the designated first and second installer programs in the designated activation order; and registering the created setup program in a storage region in the peripheral device, wherein the setup program is changed in the peripheral device such that an installer program which is included in the setup program and which is for installing a program other than a cooperation program operating in cooperation with a program installed in the peripheral device is not activated in the information processing apparatus.

12. A non-transitory computer readable storage medium storing a computer program that causes a computer to execute the method according to claim 11.

* * * * *